United States Patent
Nakamura et al.

(10) Patent No.: US 9,914,430 B2
(45) Date of Patent: Mar. 13, 2018

(54) WEBBING TAKE-UP DEVICE

(71) Applicant: KABUSHIKI KAISHA TOKAI-RIKA-DENKI-SEISAKUSHO, Aichi (JP)

(72) Inventors: Ayaka Nakamura, Aichi (JP); Masanori Ukai, Aichi (JP); Wataru Yanagawa, Aichi (JP); Masaru Ukita, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 225 days.

(21) Appl. No.: 14/783,149

(22) PCT Filed: Apr. 2, 2014

(86) PCT No.: PCT/JP2014/059776
§ 371 (c)(1),
(2) Date: Oct. 8, 2015

(87) PCT Pub. No.: WO2014/168063
PCT Pub. Date: Oct. 16, 2014

(65) Prior Publication Data
US 2016/0046260 A1 Feb. 18, 2016

(30) Foreign Application Priority Data
Apr. 12, 2013 (JP) ................. 2013-084172

(51) Int. Cl.
B60R 22/28 (2006.01)
B60R 22/34 (2006.01)
B60R 22/36 (2006.01)

(52) U.S. Cl.
CPC .......... *B60R 22/3413* (2013.01); *B60R 22/28* (2013.01); *B60R 22/36* (2013.01); *B60R 2022/287* (2013.01)

(58) Field of Classification Search
CPC ...... B60R 22/28; B60R 22/36; B60R 22/3413
See application file for complete search history.

(56) References Cited

U.S. PATENT DOCUMENTS 5,799,893 A 9/1998 Miller, III et al.
6,012,667 A 1/2000 Clancy, III et al.
(Continued)

FOREIGN PATENT DOCUMENTS

JP 2002503586 A 2/2002
JP 2012096745 A 5/2012
(Continued)

OTHER PUBLICATIONS

International search report for application PCT/JP2014/059776, dated Jun. 24, 2014.

Primary Examiner — Sang K Kim
(74) Attorney, Agent, or Firm — Roberts Mlotkowski Safran Cole & Calderon P.C.

(57) ABSTRACT

A webbing take-up device is obtained in which the number of rotations of a spool from the start of deformation of a first energy absorption member until the start of deformation of a second energy absorption member can exceed one rotation. In a webbing take-up device, a restricting tab is provided at an open side of the engagement recess portion. Although the leading end of the stopper pawl and the engagement recess portion face each other in the first rotation of the lock ring, a leading end of a stopper pawl is thereby unable to enter inside the engagement recess portion. The restricting tab is restricted from rotating when the leading end of the stopper pawl abuts an abutting portion of the restricting tab. When the lock ring accordingly rotates in a pull-out direction, the (Continued)

restricting tab moves relative to the open side of the engagement recess portion. When the leading end of the stopper pawl and the engagement recess portion face each other in this state, the leading end of the stopper pawl is thereby able to enter the engagement recess portion.

2 Claims, 25 Drawing Sheets

(56) References Cited

U.S. PATENT DOCUMENTS

| | | | |
|---|---|---|---|
| 2012/0175451 A1 | 7/2012 | Yanagawa et al. | |
| 2012/0318904 A1 | 12/2012 | Ukita et al. | |
| 2014/0203132 A1* | 7/2014 | Yamada | B60R 22/3416 |
| | | | 242/382.1 |
| 2014/0239108 A1* | 8/2014 | Yanagawa | B60R 22/4676 |
| | | | 242/379.1 |

FOREIGN PATENT DOCUMENTS

| | | |
|---|---|---|
| JP | 2012144123 A | 8/2012 |
| JP | 2013060135 A | 4/2013 |
| JP | 2013001313 A | 7/2013 |
| WO | 9836951 A1 | 8/1998 |

* cited by examiner

US 9,914,430 B2

WEBBING TAKE-UP DEVICE

TECHNICAL FIELD

The present invention relates to a webbing take-up device that takes up webbing of a vehicle seatbelt device.

BACKGROUND ART

A webbing take-up device described in Japanese Patent Application Laid-Open (JP-A) No. 2012-96745 includes a force limiter configured including a main torsion shaft and a sub torsion shaft. When the force limiter starts to operate in this webbing take-up device, first, the main torsion shaft undergoes twisting deformation and the entire sub torsion shaft rotates together with a spool accompanying rotation of the spool in a pull-out direction. When the spool rotates to a specific angle in the pull-out direction from this state, the sub torsion shaft also undergoes twisting deformation.

Namely, the size of the energy absorption load can be switched partway through operation of the force limiter in this webbing take-up device.

SUMMARY OF INVENTION

Technical Subject

The webbing take-up device also includes a lock ring. The lock ring rotates in the pull-out direction together with the sub torsion shaft during the operating state of the force limiter. A lock portion is formed at the lock ring, such that when the lock ring rotates in the pull-out direction and the lock portion abuts a switching face formed at a body, the lock ring is restricted from rotating in the pull-out direction. A leading end side of the sub torsion shaft is restricted from rotating in the pull-out direction due to the lock ring being restricted from rotating in the pull-out direction. Configuration is such that the sub torsion shaft undergoes twisting deformation due to the spool rotating in the pull-out direction in this state.

Since the lock ring is restricted from rotating by the lock portion abutting the switching face formed at the body in this manner, the lock ring is unable to rotate more than one rotation in the pull-out direction. Thus the number of rotations of the spool in the pull-out direction from the start of twisting deformation by the main torsion shaft until the start of twisting deformation by the sub torsion shaft is limited to less than one rotation.

In consideration of the above circumstances, the present invention obtains a webbing take-up device in which the number of rotations of a spool from the start of deformation of a first energy absorption member until the start of deformation of a second energy absorption member can exceed one rotation.

Solution to Subject

A webbing take-up device of a first aspect of the present invention includes: a spool that takes up webbing; a lock base that is provided at one axial direction end side of the spool so as to be rotatable relative to the spool; a first energy absorption member that deforms due to the spool rotating in a pull-out direction relative to the lock base; a second energy absorption member that has one end linked to the spool in a state in which rotation relative to the spool is restricted and that deforms due to the one end rotating in the pull-out direction relative to another end; a rotating body that is provided at another axial direction end side of the spool and that is rotatable coaxially with the spool; a coupling member that operates by the spool rotating in the pull-out direction relative to the lock base, that couples the rotating body to the other end of the second energy absorption member, thereby enabling the other end of the second energy absorption member and the rotating body to rotate as a single unit in the pull-out direction; a lock member that is provided beside the rotating body, that is capable of moving in a direction approaching the rotating body, and that restricts the rotating body from rotating in the pull-out direction by approaching the rotating body and engaging with an engagement portion formed at the rotating body; and a restricting member that restricts the lock member from moving to an engaged position with the engagement portion, and that releases the movement restriction on the lock member after the rotating body has rotated once in the pull-out direction.

In the webbing take-up device of the first aspect, the lock base is provided at the one axial direction end side of the spool. The first energy absorption member is deformed when the spool rotates in the pull-out direction in a state in which the lock base is restricted from rotating in the pull-out direction. Part of the rotation force of the spool in the pull-out direction is thereby supplied to the first energy absorption member and absorbed as deformation of the first energy absorption member.

The one end of the second energy absorption member is linked to the spool in a state in which rotation relative to the spool is restricted. The rotating body is provided at the other axial direction side of the spool so as to be rotatable. When the spool rotates in the pull-out direction relative to the lock base, the coupling member operates, and the rotating body is indirectly coupled to the other end of the second energy absorption member. The rotating body is thereby able to rotate in the pull-out direction as a single unit with the other end of the second energy absorption member.

When the lock member engages with the engagement portion of the rotating body in this state, the rotating body is restricted from rotating in the pull-out direction, and the other end of the second energy absorption member is thereby restricted from rotating in the pull-out direction. Thus when the spool rotates in the pull-out direction in this state, part of the rotation force of the spool in the pull-out direction is not only supplied to the first energy absorption member and absorbed as deformation of the first energy absorption member, but also supplied to the second energy absorption member and absorbed as deformation of the second energy absorption member.

The webbing take-up device according the present invention includes the restricting member, and the lock member is restricted from moving to an engaged position with the engagement portion by the restricting member. However, the movement restriction of the lock member by the restricting member is released in the event that the rotating body has rotated once in the pull-out direction. Thus when the engagement portion arrives beside the lock member again after the engagement portion has passed once beside the lock member, the lock member engages with the engagement portion, and the rotating body is restricted from rotating in the pull-out direction.

This enables the second energy absorption member to be made to deform after the spool has rotated more than one rotation relative to the lock base.

A webbing take-up device of a second aspect of the present invention is the first aspect, wherein the engagement portion is configured by an engagement recess portion open at an outer peripheral portion of the rotating body, and the rotating body is restricted from rotating in the pull-out direction by the lock member entering the engagement recess portion. The restricting member is provided outside of the engagement recess portion such that the restricting member is configured to be rotatable together with the rotating body, and to restrict the lock member from entering the engagement recess portion. Rotation of the restricting member together with the rotating body in the pull-out direction is restricted in the event that the engagement recess portion arrives beside the lock member in the first rotation of the rotating body or in the event that the engagement recess portion has passed beside the lock member after the first rotation. By the rotating body further rotating in the pull-out direction in this state, the restricting member moves away from the outside of the engagement recess portion and releases the movement restriction on the lock member.

In the webbing take-up device of the second aspect, the engagement portion of the rotating body is configured by the engagement recess portion open at the outer peripheral portion of the rotating body. When the lock member approaches the outer peripheral portion of the rotating body and enters the engagement recess portion, the rotating body is restricted from rotating in the pull-out direction by the lock member.

However, the restricting member is provided outside of the engagement recess portion so as to be capable of rotating together with the rotating body. Thus, when the rotating body rotates and the engagement recess portion passes beside the lock member, the restricting member abuts the lock member when the lock member attempts to enter the engagement recess portion. The lock member is thereby restricted from entering the engagement recess portion.

In the event that the engagement recess portion arrives beside the lock member in the first rotation of the rotating body or in the event that the engagement recess portion has passed beside the lock member after the first rotation, the restricting member moves away from the outside of the engagement recess portion due to further rotation of the rotating body in the pull-out direction. The lock member thereby enters the engagement recess portion when the engagement recess portion arrives beside the lock member again, and the rotating body is restricted from rotating in the pull-out direction by the lock member.

A webbing take-up device of a third aspect of the present invention is the second aspect, wherein: the lock member is configured to be biased toward a direction approaching the outer peripheral portion of the rotating body and press-contacts the outer peripheral portion of the rotating body; and the restricting member is configured to be restricted from rotating in the pull-out direction by the lock member engaging with the restricting member, and the restricting member enters the engagement recess portion together with the lock member and releases the movement restriction on the lock member after one rotation of the rotating body.

In the webbing take-up device of the third aspect, the lock member is biased toward the outer peripheral portion side of the rotating body, and the lock member thereby press-contacts the outer peripheral portion of the rotating body. When the engagement recess portion arrives beside the lock member in the first rotation of the rotating body, the lock member press-contacts the restricting member provided outside of the engagement recess portion. The lock member thereby engages with the restricting member and is restricted from entering the engagement recess portion.

The restricting member is restricted from rotating in the pull-out direction by the lock member, even when the rotating body rotates in the pull-out direction in this state. The restricting member moves away from the outside of the engagement recess portion due to the rotating body rotating in the pull-out direction relative to the restricting member in this manner. When the rotating body rotates further from this state, and the engagement recess portion arrives beside the lock member again, the restricting member enters the engagement recess portion together with the lock member. The rotating body is thereby restricted from rotating in the pull-out direction.

A webbing take-up device of a fourth aspect of the present invention is the second aspect, wherein the webbing take-up device further includes a support member; the lock member is supported by the support member so as to be capable of moving in a direction approaching the outer peripheral portion of the rotating body, and is biased in the direction approaching the outer peripheral portion of the rotating body; and the restricting member is configured to abut a specific location of the support member and to be restricted from rotating in the pull-out direction after the engagement recess portion has passed beside the lock member in the first rotation of the rotating body.

The webbing take-up device of the fourth aspect further includes the support member, the lock member is supported by the support member so as to be capable of moving in a direction approaching the outer peripheral portion of the rotating body, and is biased toward the outer peripheral portion side of the rotating body. The lock member thereby press-contacts the outer peripheral portion of the rotating body. When the engagement recess portion arrives beside the lock member in the first rotation of the rotating body, the lock member press-contacts the restricting member provided outside of the engagement recess portion. The lock member is thereby restricted from entering the engagement recess portion. When the rotating body rotates further in the pull-out direction from this state, the restricting member abuts the specific location of the support member. The restricting member is thereby restricted from rotating in the pull-out direction.

The restricting member thereby moves away from the outside of the engagement recess portion due to the rotating body rotating in the pull-out direction in this state. When the engagement recess portion arrives beside the lock member again from this state, the lock member enters the engagement recess portion. The rotating body is thereby restricted from rotating in the pull-out direction.

A webbing take-up device of a fifth aspect of the present invention is the first aspect, wherein: the engagement portion is configured by an engagement recess portion open at an outer peripheral portion of the rotating body, and the rotating body is restricted from rotating in the pull-out direction by the lock member entering the engagement recess portion; the lock member is biased in a direction approaching the outer peripheral portion of the rotating body; and the restricting member is provided outside of the engagement recess portion, a portion of the restricting member engages with the rotating body and is pressed by the rotating body in the first rotation of the rotating body, and the restricting member is configured to be moved in a direction away from the outside of the engagement recess portion and to release the movement restriction on the lock member after the engagement recess portion has passed beside the lock member.

In the webbing take-up device of the fifth aspect, the engagement portion of the rotating body is configured by the engagement recess portion open at the outer peripheral portion of the rotating body. The lock member is biased in a direction approaching the outer peripheral portion of the rotating body. The rotating body is thereby restricted from rotating in the pull-out direction by the lock member when the lock member moves and enters the engagement recess portion.

However, the restricting member is provided outside of the engagement recess portion, and a portion of the restricting member engages with the rotating body and is pressed by the rotating body in the first rotation of the rotating body. The restricting member is pressed by the rotating body and moves when the rotating body rotates in the pull-out direction. When the engagement recess portion arrives beside the lock member due to rotation of the rotating body in the pull-out direction, the lock member moves in a direction approaching the outer peripheral portion of the rotating body, and abuts the restricting member provided outside of the engagement recess portion. The lock member is therefore unable to enter the engagement recess portion.

The restricting member is pressed by the rotating body and moves when the rotating body rotates further in the pull-out direction in this state, and the restricting member thereby moves away from the outside of the engagement recess portion. When the rotating body rotates further in the pull-out direction and the engagement recess portion arrives beside the lock member again, the lock member thereby enters the engagement recess portion. The rotating body is thereby restricted from rotating in the pull-out direction.

A webbing take-up device of a sixth aspect of the present invention is the first aspect, wherein: the engagement portion is configured by an engagement protrusion portion projecting toward the outside of the rotating body from an outer peripheral portion of the rotating body, and the rotating body is restricted from rotating in the pull-out direction by the lock member abutting the engagement protrusion portion from the pull-out direction side; the restricting member is provided on a rotation trajectory of the engagement protrusion portion due to rotation of the rotating body, the restricting member is configured to support the lock member and to restrict movement of the lock member, the restricting member faces the engagement protrusion portion of the rotating body that is rotated in the pull-out direction in the first rotation of the rotating body, the restricting member is thereby pressed and displaced by the engagement protrusion portion, and the restricting member releases the support of the lock member. The lock member is configured to be biased in a direction approaching the outer peripheral portion of the rotating body, to press-contact a radial direction outside face of the engagement protrusion portion due to the support of the lock member by the restricting member being released, to approach the outer peripheral portion of the rotating body due to the rotating body rotating further in the pull-out direction and to be able to abut the engagement protrusion portion of the rotating body.

In the webbing take-up device of the sixth aspect, the engagement portion of the rotating body is configured by the engagement protrusion portion that projects toward the outside of the rotating body from the outer peripheral portion of the rotating body. The lock member is biased in a direction approaching the outer peripheral portion of the rotating body, and the rotating body is restricted from rotating in the pull-out direction by the lock member when the lock member abuts the engagement protrusion portion from the pull-out direction side of the engagement protrusion portion.

However, the restricting member is provided on the rotation trajectory of the engagement protrusion portion by rotation of the rotating body. The lock member is supported by the restricting member, and the lock member is thereby restricted from moving in a direction approaching the outer peripheral portion of the rotating body. The restricting member is pressed and displaced by the engagement protrusion portion when the rotating body rotates in the pull-out direction and the engagement protrusion portion arrives beside the restricting member. The movement restriction on the lock member by the restricting member is released when the restricting member is displaced in this manner. The lock member thereby press-contacts the radial direction outside face of the engagement protrusion portion.

When the rotating body rotates further in the pull-out direction in this state, the lock member moves away from the outside face of the engagement protrusion portion and approaches the outer peripheral face of the rotating body. When the rotating body rotates further in the pull-out direction in this state and the engagement protrusion portion approaches the lock member, the lock member abuts the engagement protrusion portion from the pull-out direction side. The rotating body is thereby restricted from rotating in the pull-out direction.

A webbing take-up device of a seventh aspect of the present invention is the sixth aspect, wherein the webbing take-up device further includes a support member, and the restricting member is an elastic tab provided at the support member and the restricting member is biased toward the lock member, and supports and restricts movement of the lock member.

In the webbing take-up device of the seventh aspect, the lock member is supported by the elastic tab and is suppressed from abutting the rotating body, the elastic tab is deformed and releases the support of the lock member due to the rotating body pressing the elastic tab, and the lock member is able to abut the rotating body, using a simple configuration in which the elastic tab is provided to the support member.

Advantageous Effects of Invention

As explained above, in the webbing take-up device according to the present invention, the number of rotations of a spool from the start of deformation of a first energy absorption member until the start of deformation of a second energy absorption member can exceed one rotation.

DESCRIPTION OF EMBODIMENTS

Figure 1:
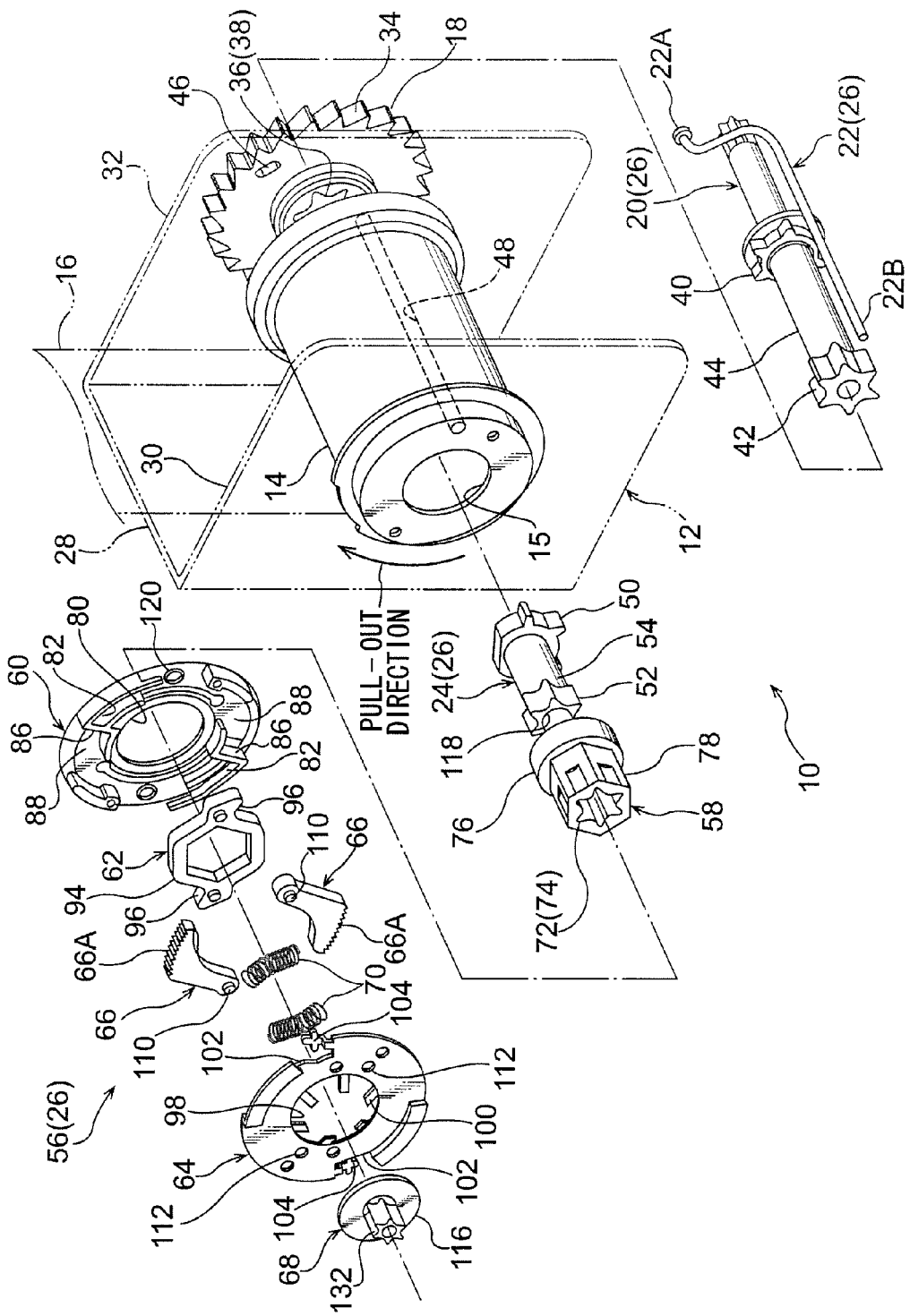
FIG. 1 is an exploded perspective view illustrating a configuration of a clutch mechanism of a webbing take-up device according to a first exemplary embodiment.

Explanation follows regarding exemplary embodiments of the present invention. Note that, in the below explanation of each of the exemplary embodiments, portions that are substantially the same are applied with the same reference numerals, and detailed duplicate explanation thereof is omitted.

Configuration of First Exemplary Embodiment

FIG. 1 is an exploded perspective view illustrating a configuration of a clutch mechanism 56 of a webbing take-up device 10 according to a first exemplary embodiment.

As illustrated in FIG. 1, the webbing take-up device 10 includes a frame 12. The frame 12 includes a back plate 28. The back plate 28 is formed in a flat plate shape, and leg plates 30, 32 extend toward one thickness direction side of the back plate 28 from both width direction ends thereof. The webbing take-up device 10 also includes a spool 14. The direction of the central axis line of the spool 14 runs along the direction in which the leg plate 30 and the leg plate 32 face each other, and a large portion of the spool 14 is positioned between the leg plate 30 and the leg plate 32.

A length direction base end side of elongated belt shaped webbing 16 is anchored to the spool 14. The webbing 16 is taken up in layered form onto an outer peripheral portion of the spool 14 from the length direction base end side when the spool 14 rotates in a take-up direction, this being one direction about the central axis line. The webbing 16 that has been taken up by the spool 14 is pulled out from the spool 14 while the spool 14 rotates in a pull-out direction, this being the opposite direction to the take-up direction, when the webbing 16 is pulled toward a length direction leading end side thereof.

A through-hole 15 is formed piercing through the central axis line direction of the spool 14. A main torsion shaft 20 serving as a first energy absorption member, and a sub torsion shaft 24 serving as a second energy absorption member, are coaxially provided inside the through-hole 15. A force limiter mechanism 26 is configured including the main torsion shaft 20 and the sub torsion shaft 24.

A leading end side of the main torsion shaft 20 is disposed coaxially with the spool 14 inside the through-hole 15 than a length direction intermediate portion of the main torsion shaft 20. A spline shaped spool-side engaging portion 42 is formed at a leading end portion of the main torsion shaft 20. An engaged portion (not illustrated in the drawings) that corresponds to the spool-side engaging portion 42 is formed at an inner peripheral portion of the through-hole 15 at an intermediate portion in a central axis line direction of the spool 14. The spool-side engaging portion 42 engages with the engaged portion, thereby linking the main torsion shaft 20 to the spool 14 in a state in which the main torsion shaft 20 is restricted from rotating relative to the spool 14.

A lock gear-side engaging portion 40 is formed at the length direction intermediate portion of the main torsion shaft 20. A lock gear 18 that corresponds to the lock gear-side engaging portion 40 and serves as a lock base configuring a lock mechanism is provided at the leg plate 32 side of the spool 14. The lock gear 18 is disposed coaxially with the spool 14, and a ratchet gear portion 34 is formed at an outer peripheral portion thereof. A through-hole 36 that pierces through the central axis line direction of the lock gear 18 is formed at an axial center portion of the lock gear 18, and a spline shaped engaged portion 38 is formed at an inner peripheral portion of the through-hole 36.

The lock gear-side engaging portion 40 of the main torsion shaft 20 described above engages with the engaged portion 38, such that the lock gear 18 is restricted from rotating relative to the main torsion shaft 20, and the lock gear 18 is restricted from rotating relative to the spool 14. A rod shaped main energy absorption portion 44 is configured between the lock gear-side engaging portion 40 and the spool-side engaging portion 42 of the main torsion shaft 20. The main energy absorption portion 44 deforms by twisting when the spool 14 rotates in the pull-out direction relative to the lock gear 18.

The lock mechanism of the webbing take-up device 10 configured including the lock gear 18 is provided with a lock pawl, not illustrated in the drawings, capable of moving toward and away from the outer peripheral portion of the lock gear 18 (namely, the ratchet gear portion 34). The lock gear 18 is restricted from rotating in the pull-out direction by the lock pawl when the lock pawl approaches the outer peripheral portion of the lock gear 18 and enmeshes with the ratchet gear portion 34. Since the spool 14 is restricted from rotating relative to the lock gear 18 through the main torsion shaft 20 as described above, the spool 14 is restricted from rotating in the pull-out direction, and the webbing 16 is restricted from being pulled out from the spool 14, due to the lock gear 18 being restricted from rotating in the pull-out direction.

The lock mechanism includes a sensor mechanism that operates when the vehicle rapidly decelerates, and when the rotation acceleration of the lock gear 18 in the pull-out direction exceeds a specific magnitude, and the lock pawl moves closer to the outer peripheral portion of the lock gear 18 when the sensor mechanism operates.

An anchor hole 46 is formed further to the rotation radial direction outside of the lock gear 18 than the position at which the through-hole 36 is formed at the lock gear 18. A base end portion 22A of a trigger wire 22 is anchored to the anchor hole 46. A leading end side of the trigger wire 22 is inserted into an insertion hole 48 formed parallel to the through-hole 15 in the spool 14. A leading end portion 22B of the trigger wire 22 projects out toward the outside of the spool 14 from an open end at the leg plate 30 side of the insertion hole 48.

The sub torsion shaft 24 is disposed coaxially with the spool 14, further to the leg plate 30 side inside the through-hole 15 than the main torsion shaft 20. A spline shaped spool-side engaging portion 50 is formed at a base end portion of the sub torsion shaft 24, positioned at the central axis line direction center side of the lock gear 18 in the sub torsion shaft 24.

The spool-side engaging portion 50 engages with an engaged portion, not illustrated in the drawings, formed at the inner peripheral portion of the through-hole 15 at the central axis line direction center side of the spool 14. The sub torsion shaft 24 is thereby restricted from rotating relative to the spool 14. A spline shaped sleeve-side engaging portion 52 is formed at a leading end portion of the sub torsion shaft 24, this being an end portion at the leg plate 30 side. A portion of the sub torsion shaft 24 between the sleeve-side engaging portion 52 and the spool-side engaging portion 50 configures a sub energy absorption portion 54.

The clutch mechanism 56 is provided at the leg plate 30 side of the spool 14. The clutch mechanism 56 includes a sleeve 58. A through-hole 72 is formed along the axial direction of an axial center portion of the sleeve 58. A spline shaped engaged portion 74 is formed at a leading end side of an inner peripheral portion of the through-hole 72 of the sleeve 58. The sub torsion shaft 24 is inserted into the through-hole 72 through a base end side of the sleeve 58, and the sleeve-side engaging portion 52 of the sub torsion shaft 24 engages with the engaged portion 74. The sub torsion shaft 24 is thereby restricted from rotating relative to the sleeve 58.

The clutch mechanism 56 includes a clutch guide 60. A circular shaped through-hole 80 is formed at an axial center portion of the clutch guide 60. The through-hole 80 is disposed in a state with a support portion 76 formed at the sleeve 58 piercing through. The support portion 76 is formed in a circular shape with an outer diameter dimension that is substantially the same as (strictly speaking, slightly smaller than) an inner diameter dimension of the through-hole 80 viewed along the axial direction of the sleeve 58, and the support portion 76 piercing through the through-hole 80 rotatably supports the clutch guide 60. A hole portion 120 is formed at the clutch guide 60 outside of the through-hole 80. The hole portion 120 pierces through the axial direction of the clutch guide 60. The leading end portion 22B of the trigger wire 22 described above that projects out toward the leg plate 30 side from the insertion hole 48 pierces through the hole portion 120.

A clutch cover 64 is provided at an axial direction side of the clutch guide 60 so as to face the clutch guide 60. A through-hole 98 is formed along the axial direction of an axial center portion of the clutch cover 64. Plural fitting claws 100 are formed projecting out toward the radial direction inside from an inner peripheral portion of the through-hole 98. The fitting claws 100 are each formed at a specific angle along the peripheral direction of the through-hole 98. The fitting claws 100 engage with a fitting portion 78 that is formed at the sleeve 58 and has a substantially hexagonal shaped outer peripheral profile. The clutch cover 64 is accordingly restricted from being displaced along the peripheral direction and the axial direction of the sleeve 58.

A pair of cutout portions 102 is formed at the clutch cover 64. The cutout portions 102 are formed so as to open toward the radial direction outside of the clutch cover 64. A cross-shaped claw 104 is formed inside each of the cutout portions 102. Each cross-shaped claw 104 bends in a crank shape viewed along the radial direction of the clutch cover 64, and a leading end side projects out further to the clutch guide 60 side and the take-up direction side than a base end side thereof.

One end of a coil spring 70 is anchored to each cross-shaped claw 104. Coil spring housing portions 82 that correspond to the respective coil springs 70 are formed at the clutch guide 60, and the coil springs 70 are housed inside. The coil spring housing portions 82 are each formed in a recessed shape open toward the pull-out direction side, and a bottom portion at the take-up direction side configures a press-contact wall 86. The other end of the coil spring 70 press-contacts the press-contact wall 86 under the biasing force of the coil spring 70.

In a state in which the trigger wire 22 pierces through the hole portion 120, the coil springs 70 are compressed by the cross-shaped claws 104 and the coil spring housing portions 82. When the leading end portion 22B of the trigger wire 22 is removed from the hole portion 120, the clutch guide 60 rotates in the take-up direction with respect to the clutch cover 64 due to the biasing force of the coil springs 70.

A pair of clutch plates 66, each serving as a coupling member, are provided between the clutch guide 60 and the clutch cover 64. Clutch plate housing portions 88 that correspond to the clutch plates 66 are formed at the clutch guide 60. The clutch plate housing portions 88 are formed at the take-up direction sides of the press-contact walls 86 configuring the coil spring housing portions 82, and the clutch plates 66 are housed inside the respective clutch plate housing portions 88. A turn shaft 110 is formed projecting out from a face at the clutch cover 64 side of a base end portion of each clutch plate 66.

The turn shafts 110 are inserted into hole portions 112 formed at the clutch cover 64. The clutch plates 66 are thereby rotatably supported by the clutch cover 64. The press-contact walls 86 of the clutch guide 60 approach the hole portions 112 of the clutch cover 64 when the clutch guide 60 rotates in the take-up direction relative to the clutch cover 64. When the press-contact walls 86 accordingly press against faces, that are oriented toward the central axis line side of the clutch guide 60, at leading end sides of the clutch plates 66, the leading end sides of the clutch plates 66 turn so as to project out toward the radial direction outside of the clutch guide 60.

A clutch base 62 is provided between the clutch guide 60 and the clutch cover 64. The clutch base 62 includes a fitted portion 94 with a hexagonal shaped inner peripheral profile. The inner peripheral profile of the fitted portion 94 is formed substantially the same as an outer peripheral profile of the fitting portion 78 of the sleeve 58 previously described, and the fitted portion 94 is fitted onto the fitting portion 78. The clutch base 62 is thereby restricted from rotating relative to the sleeve 58. A pair of anchor portions 96 is formed at an outer peripheral portion of the fitted portion 94. The anchor portions 96 face the clutch plates 66 from the radial direction inside of the clutch guide 60.

Figure 2:
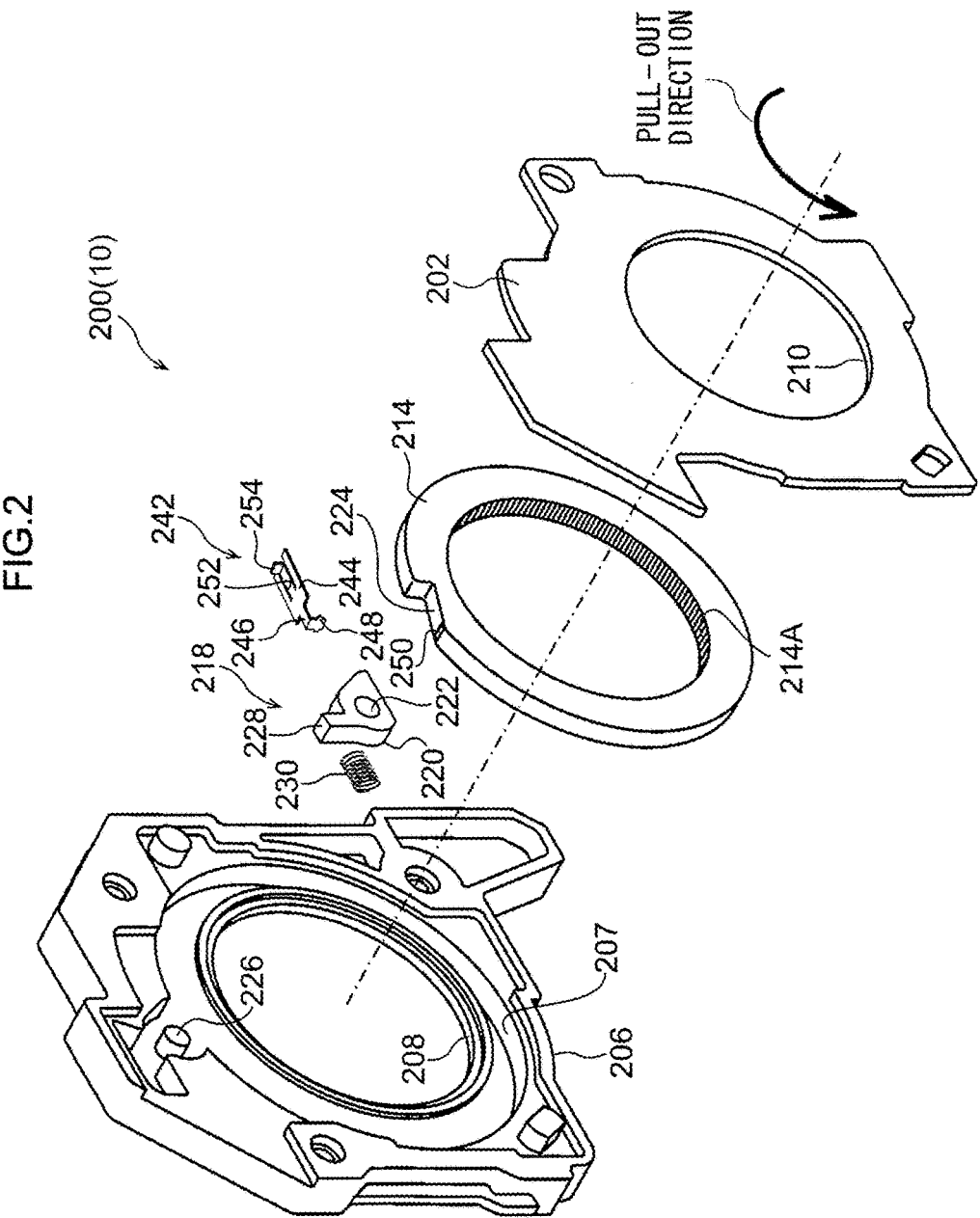
FIG. 2 is an exploded perspective view illustrating a configuration of a switch mechanism of a webbing take-up device according to the first exemplary embodiment.

As illustrated in FIG. 2, the webbing take-up device 10 includes a switch mechanism 200. The switch mechanism 200 includes a sheet member 202. A body 206, serving as a support member, is provided at the opposite side to the leg plate 30 with respect to the sheet member 202. The body 206 is formed in a recessed shape open toward the sheet member 202 side. The sheet member 202 is fitted into and fixed to the body 206 from the open side of the body 206. The open side of the body 206 is thereby closed off by the sheet member 202.

The inside of the body 206 configures a lock ring housing portion 207. A lock ring 214, serving as a rotating body, is provided inside the lock ring housing portion 207. The overall lock ring 214 is formed in a ring shape, and is rotatably supported by the body 206. A circular hole 208 is formed in the body 206 so as to pierce through the body 206. An inner diameter dimension of the circular hole 208 is set smaller than an outer diameter dimension of the lock ring 214, and the circular hole 208 is formed coaxially with the lock ring 214.

A knurled portion 214A is formed at an inner peripheral portion of the lock ring 214. Knurled portions 66A, corresponding to the knurled portion 214A, are formed at the leading end sides of the clutch plates 66 previously described. The clutch plates 66 turn such that the leading end sides project out toward the outside of the clutch plate housing portions 88, and the knurled portions 66A enmesh with the knurled portion 214A of the lock ring 214. The lock ring 214 is thereby restricted from rotating relative to the clutch plates 66.

As described above, the clutch plates 66 are restricted from rotating relative to the sleeve 58. The lock ring 214 is thereby restricted from rotating relative to the sleeve 58, and the sub torsion shaft 24 is thereby restricted from rotating relative to the sleeve-side engaging portion 52, in the event that the knurled portions 66A of the clutch plates 66 enmesh with the knurled portion 214A of the lock ring 214.

Figure 4:
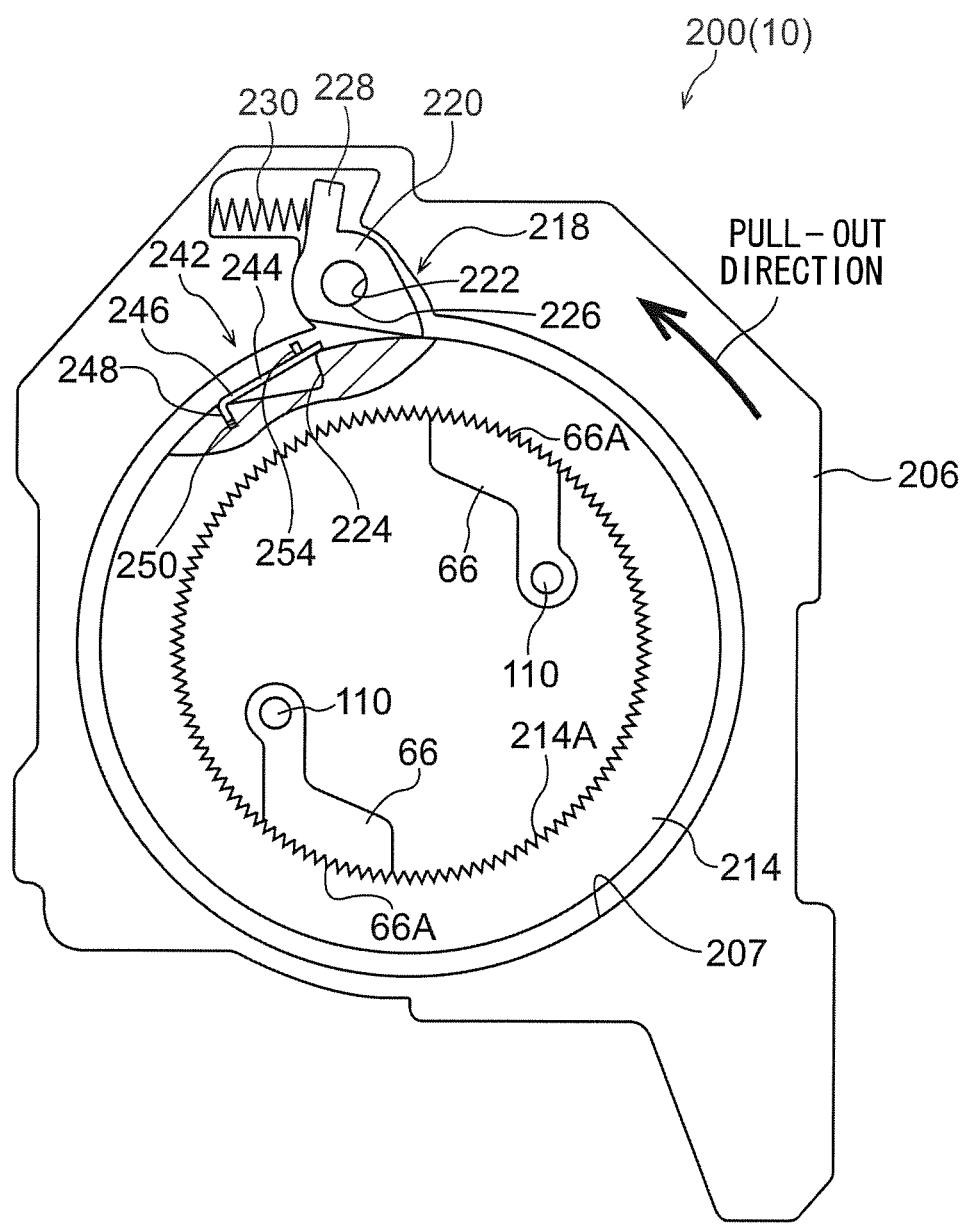
FIG. 4 is a side view illustrating an initial state of a rotating body, a lock member, and a restricting member of a webbing take-up device according to the first exemplary embodiment.

A stopper pawl 218, serving as a lock member, is provided at the radial direction outside of the lock ring 214. The stopper pawl 218 includes a pawl main body 220. A hole portion 222 is formed in the pawl main body 220. As illustrated in FIG. 4, a shaft portion 226 that corresponds to the hole portion 222 is formed at the body 206. As illustrated in FIG. 2 and FIG. 4, the shaft portion 226 is formed at the sheet member 202 side of the body 206. The shaft portion 226 enters the hole portion 222 of the pawl main body 220, such that the stopper pawl 218 is supported so as to be capable of turning about the shaft portion 226.

An engagement recess portion 224, serving as an engagement portion and corresponding to a leading end of the stopper pawl 218, is formed at an outer peripheral portion of the lock ring 214. In a state in which the engagement recess portion 224 of the lock ring 214 is positioned beside the leading end of the stopper pawl 218, the leading end of the stopper pawl 218 enters into the engagement recess portion 224 by turning in an engagement direction, this being one direction about the shaft portion 226. The lock ring 214 is restricted from rotating in the pull-out direction by the leading end of the stopper pawl 218 entering inside the engagement recess portion 224 in this manner.

An arm tab 228 extends out from an outer peripheral portion of the pawl main body 220. A compression coil spring 230 is provided beside the arm tab 228. One end of the compression coil spring 230 press-contacts the arm tab 228, such that the stopper pawl 218 is biased toward the engagement direction.

Figure 3:
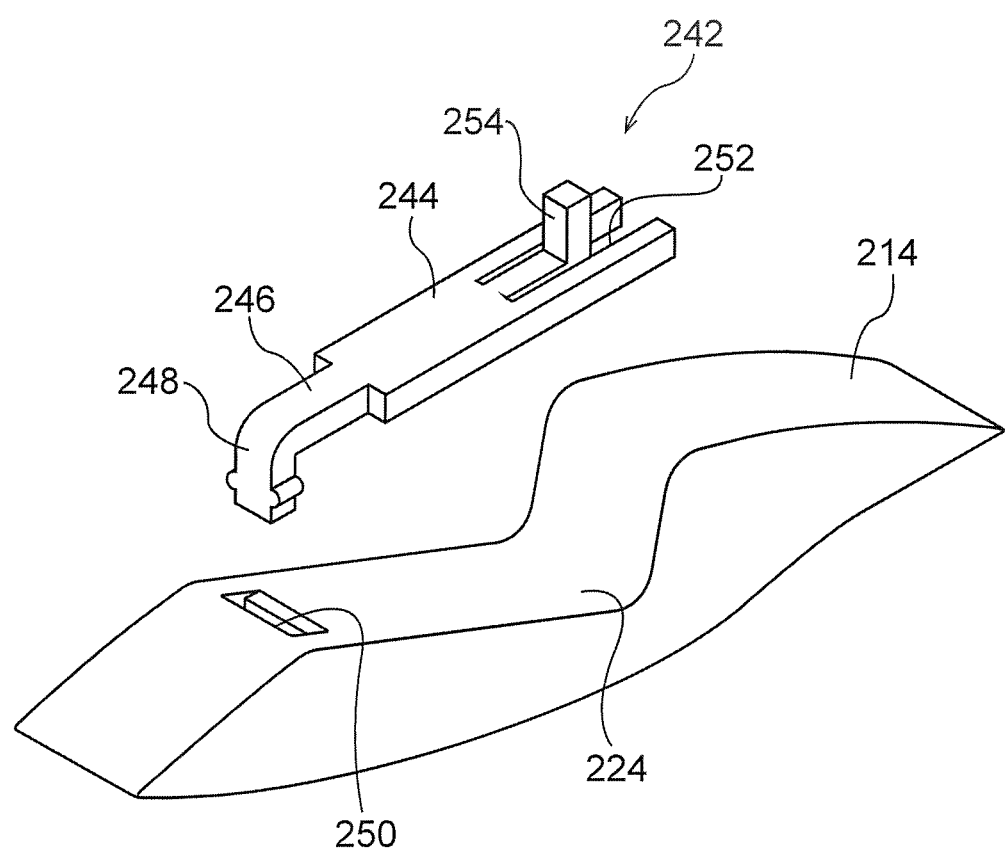
FIG. 3 is a perspective view illustrating a partial configuration of a restricting member of a webbing take-up device according to the first exemplary embodiment.

A restricting tab 242, serving as a restricting member, is provided at the lock ring 214. As illustrated in FIG. 3, the restricting tab 242 includes a restricting tab main body 244. The restricting tab main body 244 is formed in a narrow width plate shape with its length direction along a tangential line in the rotation direction of the lock ring 214. A hook shaped portion 246 extends out from one length direction end of the restricting tab main body 244. A length direction intermediate portion of the hook shaped portion 246 bends toward the radial direction inside of the lock ring 214, and a leading end of the hook shaped portion 246 configures an insertion-fitted portion 248.

An insertion-fitting hole 250 is formed at the pull-out direction side of the engagement recess portion 224 formed at the lock ring 214. The insertion-fitted portion 248 of the hook shaped portion 246 is loosely fitted into the insertion-fitting hole 250. In a state in which the insertion-fitted portion 248 is fitted into the insertion-fitting hole 250, the other length direction end portion of the restricting tab main body 244 abuts an outer peripheral face of the lock ring 214 that is further toward the take-up direction side than the engagement recess portion 224. The restricting tab main body 244 is thereby positioned at an open side of the engagement recess portion 224 so as to cap the engagement recess portion 224 from the open side. Thus, in a state in which the engagement recess portion 224 is positioned beside the leading end of the stopper pawl 218, the leading end of the stopper pawl 218 abuts the restricting tab main body 244 when the stopper pawl 218 turns in the engagement direction. The leading end of the stopper pawl 218 is accordingly unable to enter the engagement recess portion 224 in this state.

A cutout portion 252 is formed at the other length direction end portion of the restricting tab main body 244. The cutout portion 252 is open at the other length direction end portion of the restricting tab main body 244, and pierces through the thickness direction of the restricting tab main body 244. An abutting portion 254 is formed at the restricting tab main body 244. The abutting portion 254 extends from a bottom portion of the cutout portion 252 toward the other length direction end side of the restricting tab main body 244. A leading end side of the abutting portion 254 bends toward the radial direction outside of the lock ring 214 from a length direction intermediate portion thereof.

Figure 6:
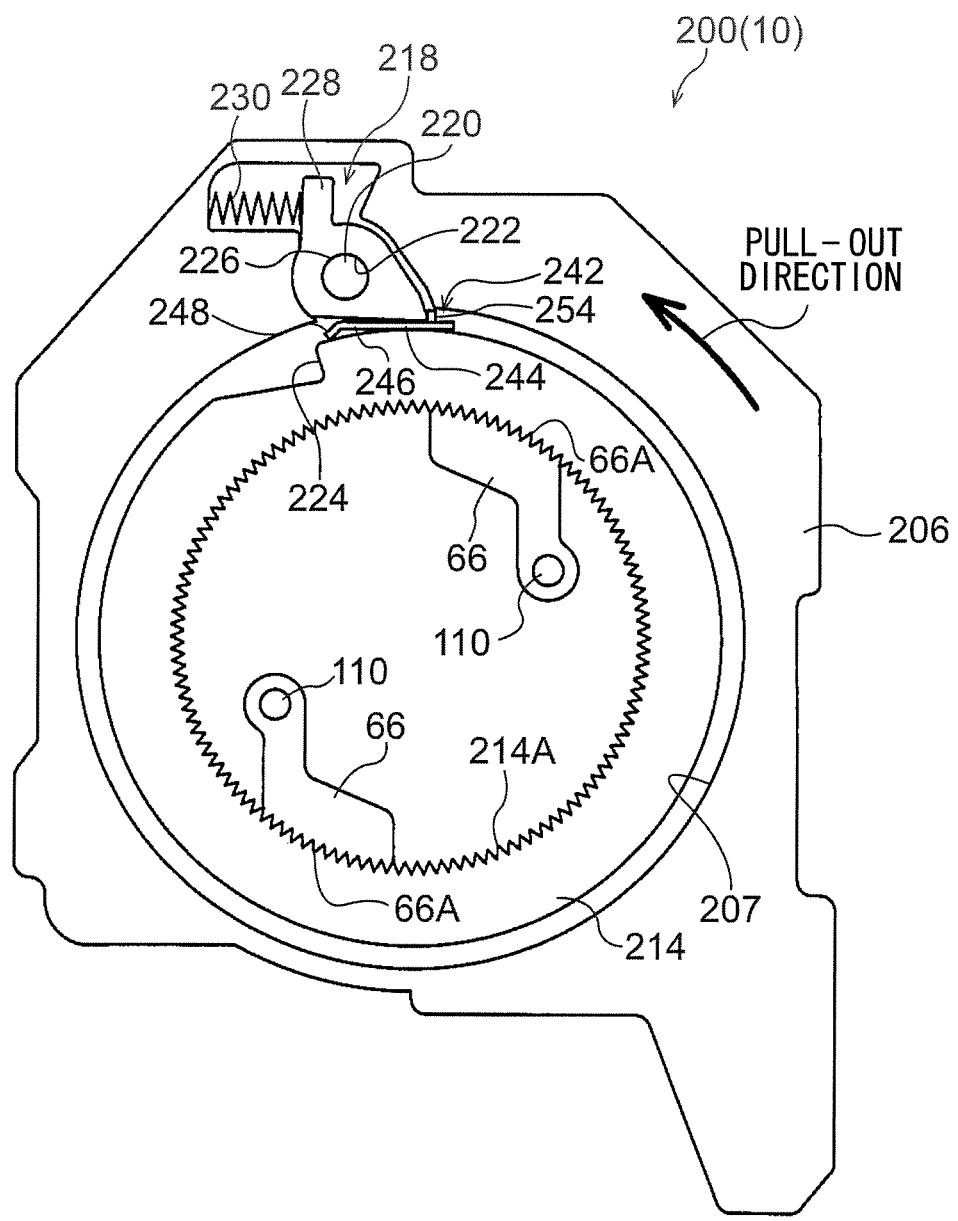
FIG. 6 is a side view corresponding to FIG. 4, illustrating a state in which the rotating body has rotated in a pull-out direction relative to the restricting member.

In a state in which the leading end of the stopper pawl 218 abuts the restricting tab main body 244, the leading end of the stopper pawl 218 abuts the leading end side of the abutting portion 254 when the lock ring 214 rotates in the pull-out direction. The restricting tab 242 is thereby restricted from moving (rotating) in the pull-out direction. As illustrated in FIG. 6, the insertion-fitted portion 248 of the hook shaped portion 246 thereby comes out of the insertion-fitting hole 250 when the lock ring 214 rotates further in the pull-out direction in this state. In this state, the restricting tab 242 does not rotate, even when the lock ring 214 rotates.

Operation and Advantageous Effects of First Exemplary Embodiment

Explanation follows regarding operation and advantageous effects of the present exemplary embodiment.

In the webbing take-up device 10, the sensor mechanism configuring the lock mechanism operates when the vehicle rapidly decelerates while running, or when the rotation acceleration of the spool 14 in the pull-out direction exceeds a specific magnitude. The lock pawl of the lock mechanism accordingly enmeshes with the ratchet gear portion 34 of the lock gear 18. The lock gear 18 is thereby restricted from rotating in the pull-out direction. The lock gear 18 is restricted from rotating relative to the spool 14 by the main torsion shaft 20. The spool 14 is thereby restricted from rotating in the pull-out direction due to the lock gear 18 being restricted from rotating in the pull-out direction.

When the webbing 16 is pulled in this state, the spool 14 attempts to rotate in the pull-out direction. When the rotation force of the spool 14 exceeds the mechanical strength of the main energy absorption portion 44 of the main torsion shaft 20 when this occurs, the spool 14 rotates in the pull-out direction while twisting and deforming the main energy absorption portion 44 of the main torsion shaft 20. The spool 14 is able to rotate in the pull-out direction proportionately to the twisting deformation amount of the main energy absorption portion 44, and the webbing 16 is pulled out from the spool 14 by a length that is proportionate to the rotation amount of the spool 14. The body of an occupant wearing the webbing 16 is thereby able to move under inertia toward the vehicle front proportionately to the length of the webbing 16 pulled out from the spool 14. Part of the pulling force imparted to the webbing 16 from the body of the occupant is supplied to the main energy absorption portion 44 and absorbed as twisting deformation of the main energy absorption portion 44.

When the spool 14 rotates in the pull-out direction relative to the lock gear 18 in this manner, the trigger wire 22 is pulled toward the base end side thereof. When the trigger wire 22 is pulled toward the base end side thereof, the leading end portion 22B of the trigger wire 22 comes out of the hole portion 120 of the clutch guide 60. The clutch guide 60 accordingly rotates in the take-up direction relative to the clutch cover 64 due to the biasing force of the coil springs 70 that have been compressed hitherto.

When the clutch guide 60 rotates in the take-up direction relative to the clutch cover 64 in this manner, the clutch plates 66 turn about the turn shafts 110, and the leading ends of the clutch plates 66 project out toward the rotation radial direction outside of the clutch guide 60. The knurled portions 66A of the clutch plates 66 thereby enmesh with the knurled portion 214A of the lock ring 214. This enables the lock ring 214 to rotate in the pull-out direction as a single unit with the clutch cover 64 through the clutch plates 66.

The clutch cover 64 is linked to the spool 14 in a state in which the clutch cover 64 is restricted from rotating relative to the spool 14 by the sleeve 58 and the sub torsion shaft 24. The lock ring 214 thereby rotates in the pull-out direction when the spool 14 rotates in the pull-out direction as described above.

As illustrated in FIG. 4, the lock ring 214 is set in an initial state such that the leading end of the stopper pawl 218 press-contacts the outer peripheral portion of the lock ring 214 further to the take-up direction side than the engagement recess portion 224.

Figure 5:
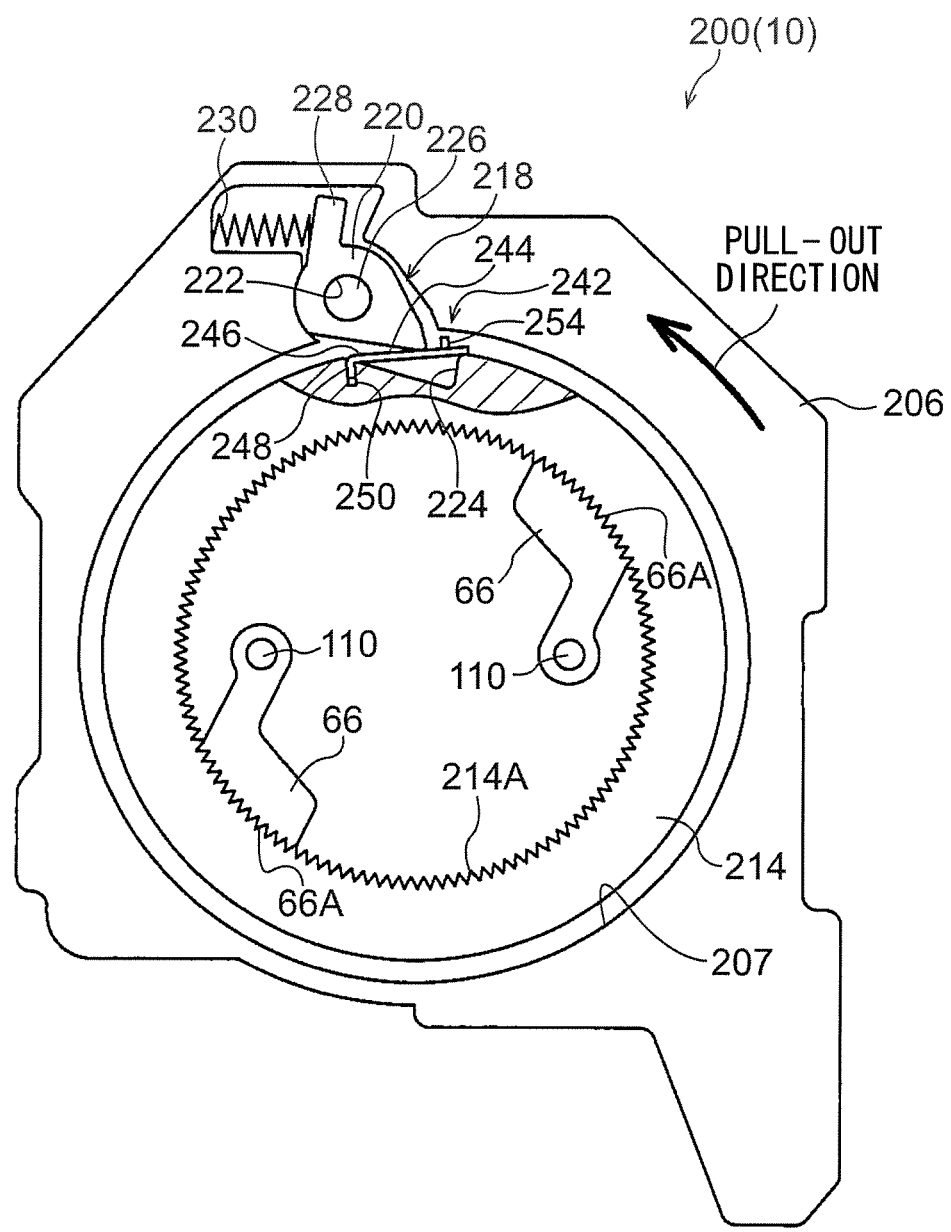
FIG. 5 is a side view corresponding to FIG. 4, illustrating a state in which the rotating body has rotated until an engagement recess portion is positioned beside the lock member in a first rotation of the rotating body.

As illustrated in FIG. 5, when the lock ring 214 rotates in the pull-out direction from this state, the lock ring 214 rotates approximately one rotation in the pull-out direction, such that the leading end of the stopper pawl 218 and the engagement recess portion 224 face each other. However, the restricting tab 242 is positioned at the open side of the engagement recess portion 224 in this state. Although facing the engagement recess portion 224, the leading end of the stopper pawl 218 is press-contacted by the restricting tab main body 244 of the restricting tab 242, and so is unable to enter inside the engagement recess portion 224.

As illustrated in FIG. 6, when the lock ring 214 is rotates further in the pull-out direction in this state, the leading end of the stopper pawl 218 abuts the leading end side of the abutting portion 254 of the restricting tab 242. The restricting tab 242 is thereby restricted from moving (turning) toward the pull-out direction side. When the lock ring 214 rotates further in the pull-out direction in this state, the insertion-fitted portion 248 of the restricting tab 242 accordingly comes out of the insertion-fitting hole 250, and slides along the outer peripheral face of the lock ring 214.

Figure 7:
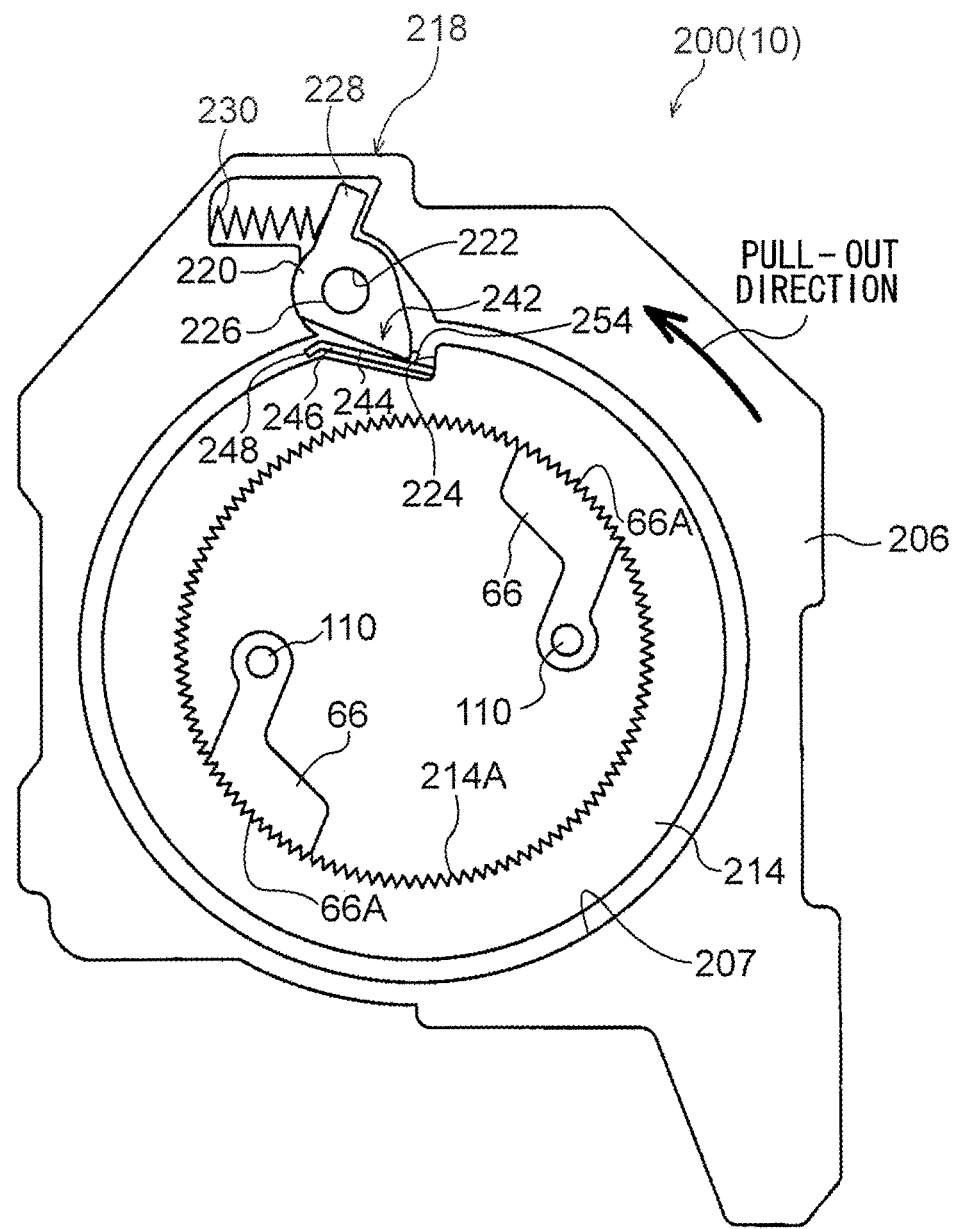
FIG. 7 is a side view corresponding to FIG. 4, illustrating a state in which the restricting member and the lock member have entered the engagement recess portion.

When the lock ring 214 further rotates once in the pull-out direction in this state, and the restricting tab 242 faces the engagement recess portion 224, as illustrated in FIG. 7, the restricting tab 242 then enters inside the engagement recess portion 224, and the leading end of the stopper pawl 218 also enters inside the engagement recess portion 224. The lock ring 214 is thereby restricted from rotating in the pull-out direction. The sleeve-side engaging portion 52 of the sub torsion shaft 24 is restricted from rotating in the pull-out direction due to the lock ring 214 being restricted from rotating in the pull-out direction in this manner.

Thus the spool 14 is able to rotate in the pull-out direction in this state, as long as the rotation force in the pull-out direction exceeds the sum of the mechanical strength of the main energy absorption portion 44 of the main torsion shaft 20, and the mechanical strength of the sub energy absorption portion 54 of the sub torsion shaft 24. This enables more energy in the pull-out direction to be absorbed than in a state in which only the main energy absorption portion 44 of the main torsion shaft 20 undergoes twisting deformation.

As described above, in the webbing take-up device 10 according to the present exemplary embodiment, the engagement recess portion 224 passes beside the leading end of the stopper pawl 218 once after the lock ring 214 has started rotating in the pull-out direction, after which the lock ring 214 is not restricted from rotating in the pull-out direction until the engagement recess portion 224 arrives beside the leading end of the stopper pawl 218 again. The number of rotations of the spool 14 occurred from the start of twisting deformation of the main torsion shaft 20 until the start of twisting deformation of the sub torsion shaft 24 therefore exceeds one rotation.

Configuration of Second Exemplary Embodiment

Explanation follows regarding a second exemplary embodiment.

Figure 9:
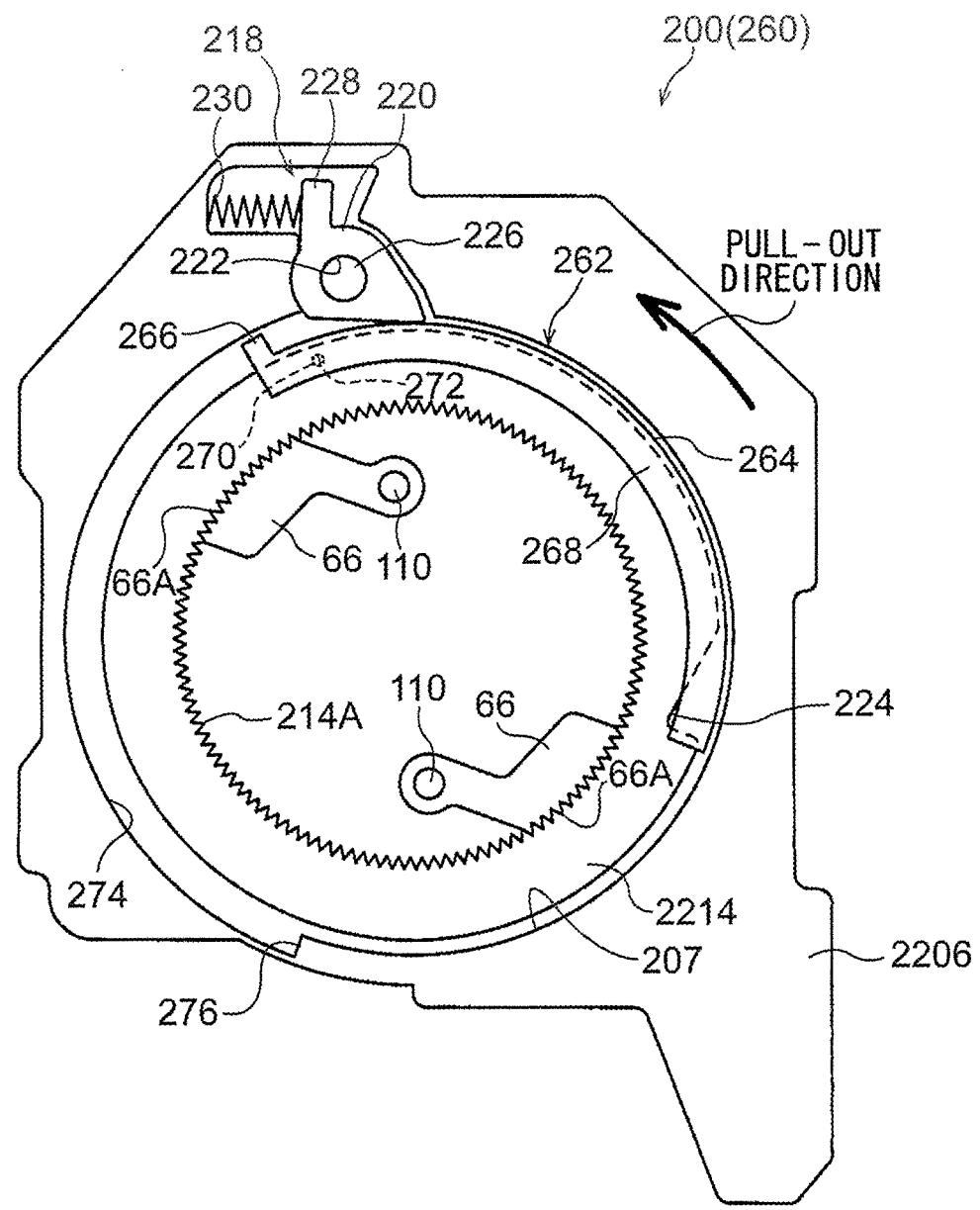
FIG. 9 is a side view illustrating an initial state of a rotating body, a lock member, and a restricting member of a webbing take-up device according to the second exemplary embodiment.

FIG. 9 is a side view corresponding to FIG. 4, used to explain the first exemplary embodiment, illustrating a configuration of relevant portions of a webbing take-up device 260 according to the present exemplary embodiment.

As illustrated in FIG. 9, the webbing take-up device 260 includes a restricting member 262. As illustrated in the perspective view in FIG. 8, the restricting member 262 includes a restricting member main body 264. The restricting member main body 264 is formed in a narrow width plate shape that curves following the outer peripheral portion of the lock ring 214. As illustrated in FIG. 9, the restricting member main body 264 is disposed running along the outer peripheral portion of the lock ring 214 outside of the outer peripheral portion of the lock ring 214. An abutting tab 266 is formed to a pull-out direction side end portion of the restricting member main body 264. The abutting tab 266 extends toward the outside of the radius of curvature direction of the restricting member main body 264.

Figure 8:
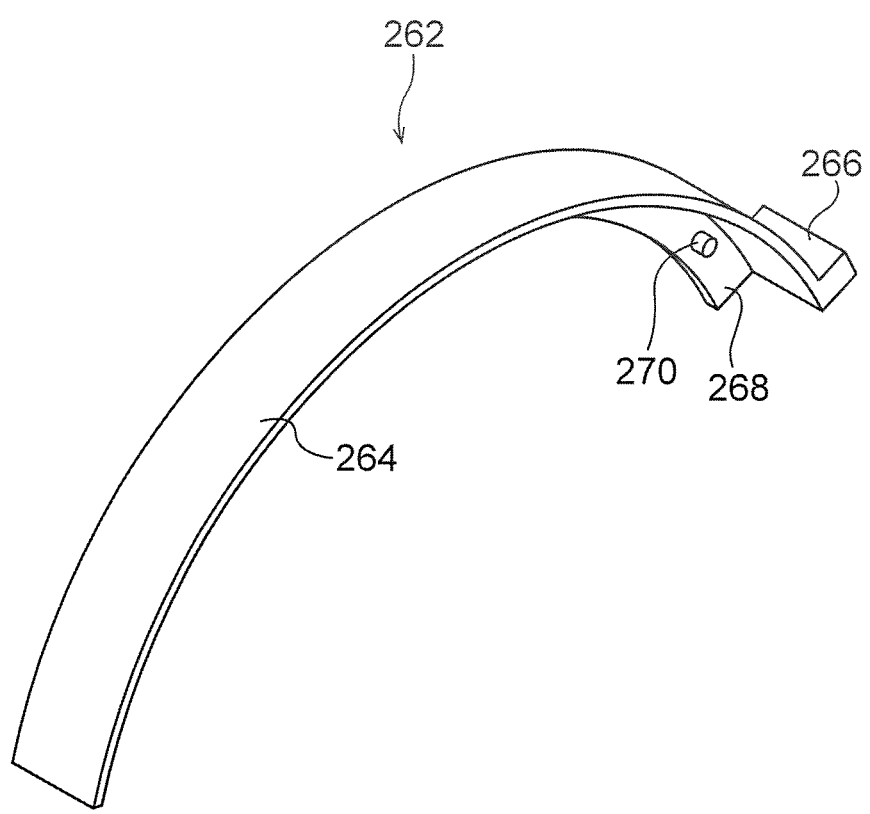
FIG. 8 is a perspective view illustrating a configuration of a restricting member of a webbing take-up device according to a second exemplary embodiment.

As illustrated in FIG. 8 and FIG. 9, an upright wall 268 is formed at one width direction end of the restricting member main body 264. As illustrated in FIG. 9, the upright wall 268 extends from the one width direction end of the restricting member main body 264 toward the inside of the radius of curvature direction of the restricting member main body 264. In a state in which the restricting member main body 264 is disposed along the outer peripheral portion of the lock ring 214, the upright wall 268 is positioned beside the face at the leg plate 30 side of the lock ring 214. As illustrated in FIG. 8, a shear pin 270 is formed projecting out from the upright wall 268 toward the lock ring 214 side. The shear pin 270 is fitted into a hole portion 272 formed at the lock ring 2214 (see FIG. 9). The restricting member 262 is thereby coupled to the lock ring 2214, and is able to rotate with the lock ring 2214 as a single unit.

As illustrated in FIG. 9, in a state in which the shear pin 270 is fitted into the hole portion 272, the restricting member 262 is positioned at the open side of the engagement recess portion 224, such that a portion at the take-up direction side of the restricting member main body 264 caps the engagement recess portion 224 from the open side thereof. The abutting tab 266 is formed at the pull-out direction side end portion of the restricting member main body 264. The abutting tab 266 extends toward the outside in the radius of curvature direction of the restricting member main body 264.

A fan-shaped hole portion 274 is formed to a body 2206. The fan-shaped hole portion 274 has a larger radius of curvature than the circular hole 208 (see FIG. 2), and is formed in a fan shape that is concentric to the circular hole 208. The abutting tab 266 enters inside the fan-shaped hole portion 274. The abutting tab 266 is capable of rotating together with the lock ring 2214 inside the fan-shaped hole portion 274. A pull-out direction side end portion of the fan-shaped hole portion 274 configures an abutting portion 276. The restricting member 262 is restricted from rotating in the pull-out direction by the abutting tab 266 abutting the abutting portion 276.

Figure 11:
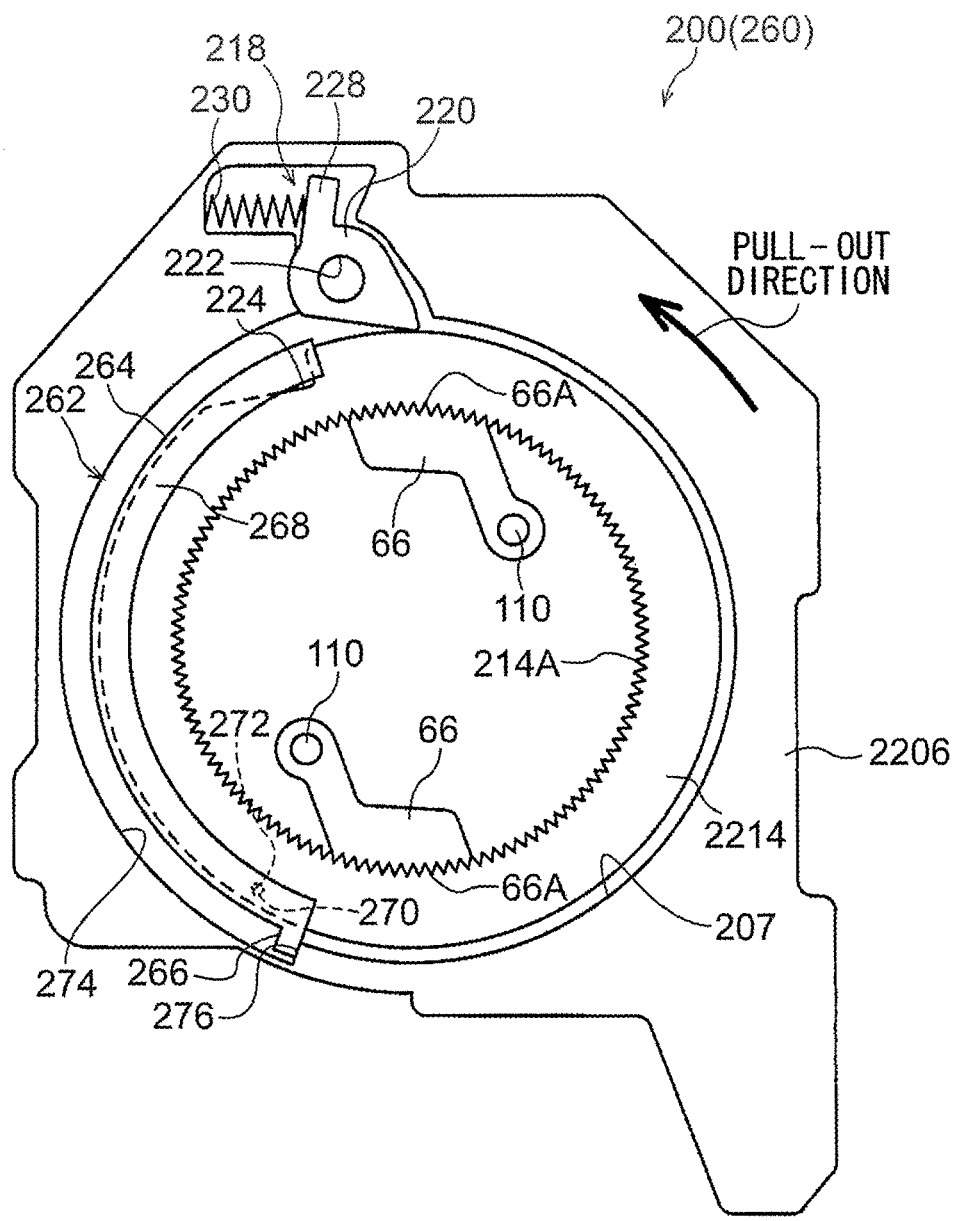
FIG. 11 is a side view corresponding to FIG. 9, illustrating a state in which the restricting member is restricted from rotating in the pull-out direction.
Figure 13:
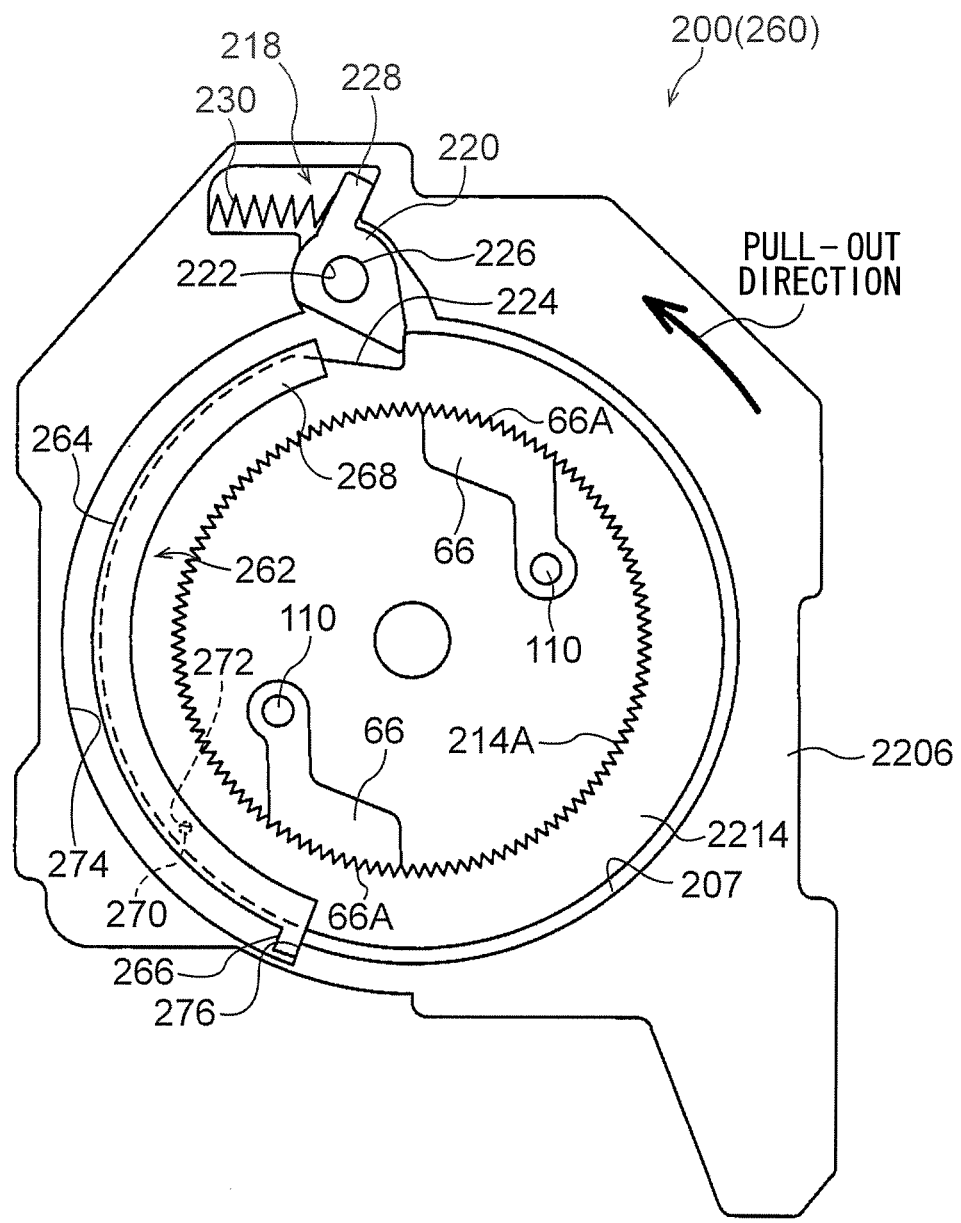
FIG. 13 is a side view corresponding to FIG. 9, illustrating a state in which the lock member has entered the engagement recess portion.

As illustrated in FIG. 11, in a state in which the abutting tab 266 abuts the abutting portion 276, the peripheral direction (length direction) length of the restricting member main body 264 is set such that a take-up direction side end portion thereof is positioned further toward the pull-out direction side than the leading end of the stopper pawl 218. Thus, in the state in which the abutting tab 266 abuts the abutting portion 276, only the lock ring 214 rotates in the pull-out direction, and the engagement recess portion 224 is positioned beside the leading end of the stopper pawl 218, then, as illustrated in FIG. 13, the leading end of the stopper pawl 218 is able to enter the engagement recess portion 224.

Operation and Advantageous Effects of Second Exemplary Embodiment

Figure 10:
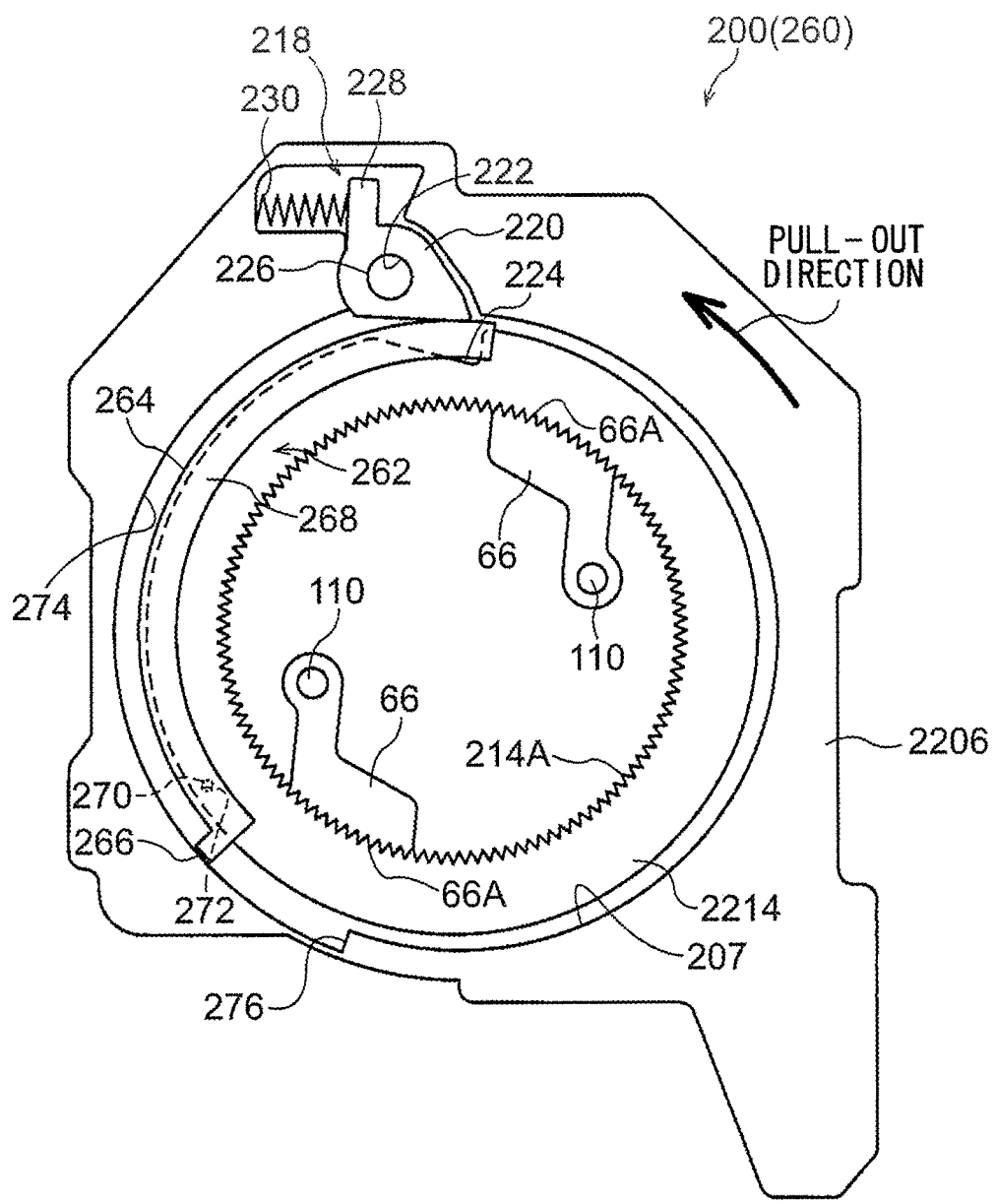
FIG. 10 is a side view corresponding to FIG. 9, illustrating a state in which the rotating body has rotated until an engagement recess portion is positioned beside the lock member in a first rotation of the rotating body.

In the initial state illustrated in FIG. 9, the leading end of the stopper pawl 218 press-contacts an outer face of the restricting member main body 264 that is further to the pull-out direction side than the engagement recess portion 224. In this state, the knurled portions 66A of the clutch plates 66 enmesh with the knurled portion 214A of the lock ring 2214, and when the lock ring 2214 rotates in the pull-out direction together with the spool 14, the restricting member 262 rotates in the pull-out direction together with the lock ring 2214. In this state, a take-up direction side portion of the restricting member main body 264 is positioned at the open side of the engagement recess portion 224. Thus, as illustrated in FIG. 10, although the leading end of the stopper pawl 218 faces the engagement recess portion 224, the leading end of the stopper pawl 218 is unable to enter the engagement recess portion 224.

Figure 12:
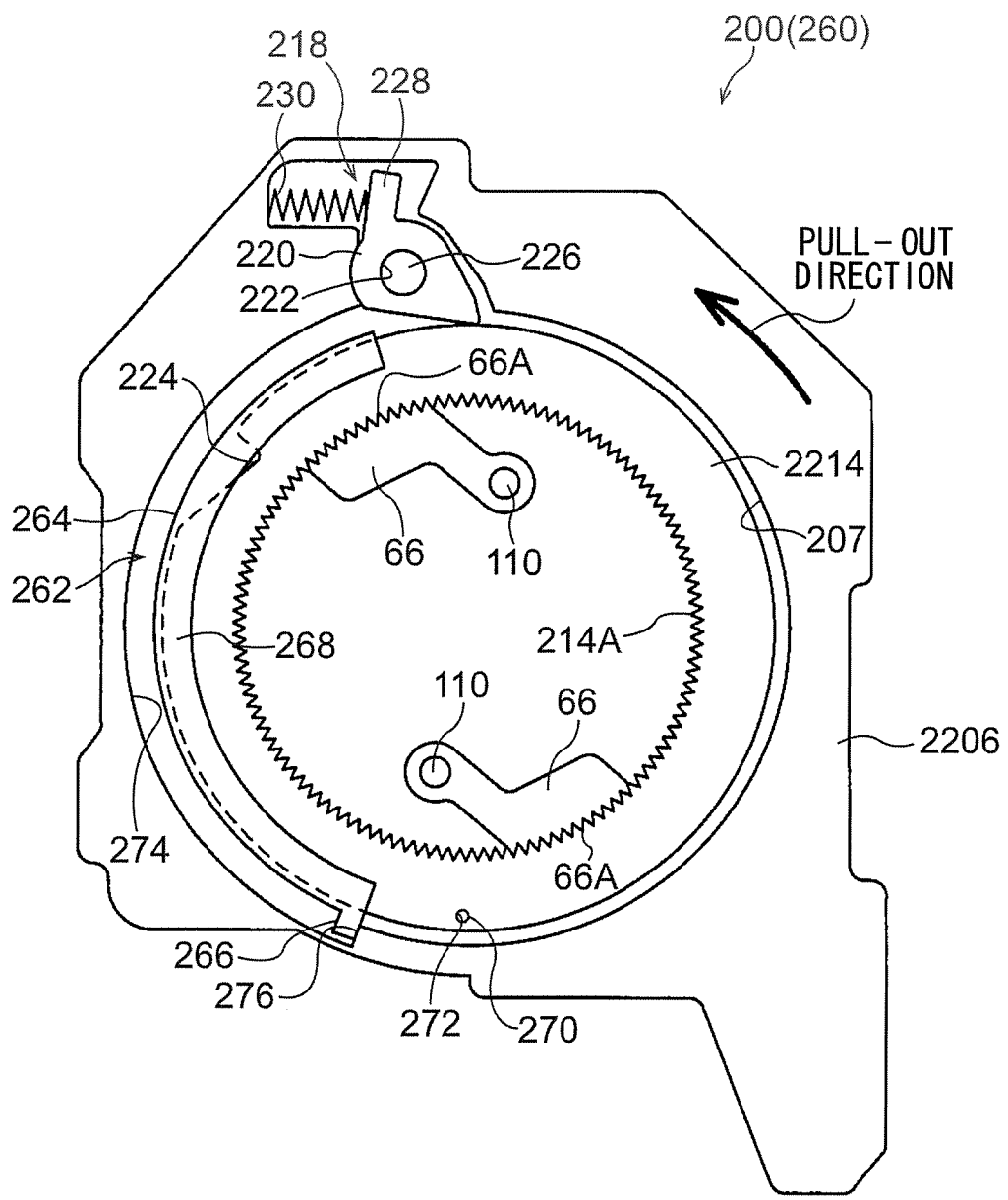
FIG. 12 is a side view corresponding to FIG. 9, illustrating a state in which the rotating body has rotated in the pull-out direction relative to the restricting member.

When the lock ring 2214 rotates further in the pull-out direction in this state, the restricting member 262 rotates further in the pull-out direction than the leading end of the stopper pawl 218, and the leading end of the stopper pawl 218 falls from the outer face of the restricting member main body 264 and press-contacts an outer peripheral face of the lock ring 2214. When the lock ring 2214 rotates further in the pull-out direction from this state, as illustrated in FIG. 11, the abutting tab 266 of the restricting member 262 then abuts the abutting portion 276 of the body 2206. The restricting member 262 is thereby restricted from rotating in the pull-out direction. When the lock ring 2214 rotates further in the pull-out direction from this state, as illustrated in FIG. 12, the shear pin 270 then breaks. This releases the coupling between the restricting member 262 and the lock ring 2214. Thus only the lock ring 2214 rotates in the pull-out direction after this occurs, and the restricting member 262 does not rotate in the pull-out direction.

As illustrated in FIG. 13, when the engagement recess portion 224 of the lock ring 214 faces the leading end of the stopper pawl 218 due to the lock ring 2214 rotating further in the pull-out direction from this state, the leading end of the stopper pawl 218 enters the engagement recess portion 224. The lock ring 2214 is thereby restricted from rotating in the pull-out direction. The sub torsion shaft 24 is restricted from rotating in the pull-out direction of the sleeve-side engaging portion 52 due to the lock ring 2214 being restricted from rotating in the pull-out direction in this manner, and the sub energy absorption portion 54 of the sub torsion shaft 24 starts to undergo twisting deformation due to the spool 14 rotating in the pull-out direction.

Thus in the webbing take-up device 260 according to the present exemplary embodiment, the engagement recess portion 224 passes beside the leading end of the stopper pawl 218 once after the lock ring 2214 has started rotating in the pull-out direction, after which the lock ring 2214 is not restricted from rotating in the pull-out direction until the engagement recess portion 224 arrives beside the leading end of the stopper pawl 218 again. The number of rotations of the spool 14 occurred from the start of twisting deformation of the main torsion shaft 20 until the start of twisting deformation of the sub torsion shaft 24 therefore exceeds one rotation.

Configuration of Third Exemplary Embodiment

Explanation follows regarding a third exemplary embodiment.

Figure 15:
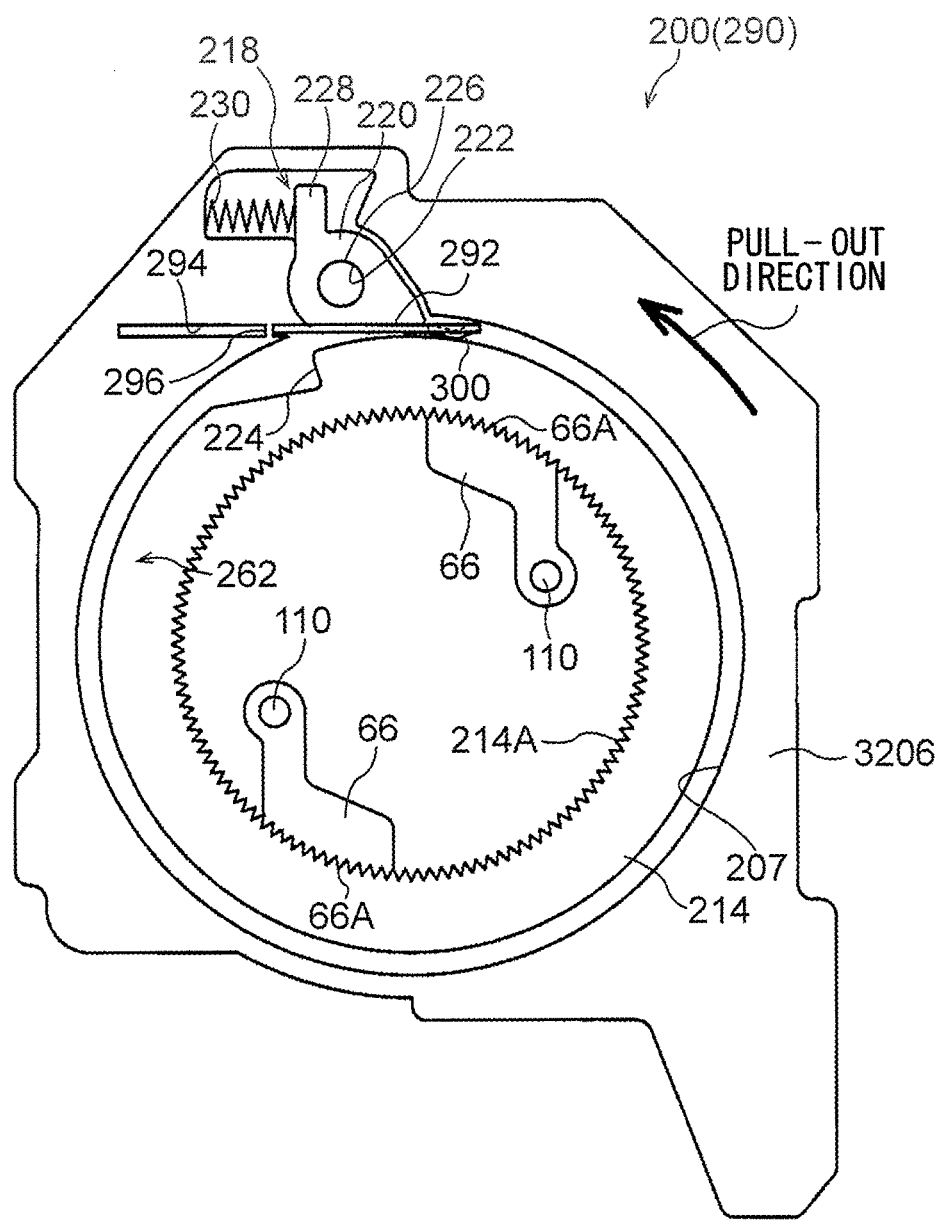
FIG. 15 is a side view illustrating an initial state of a rotating body, a lock member, and a restricting member of a webbing take-up device according to the third exemplary embodiment.

FIG. 15 is a side view corresponding to FIG. 4, used to explain the first exemplary embodiment, illustrating a configuration of relevant portions of a webbing take-up device 290 according to the present exemplary embodiment.

As illustrated in FIG. 15, the webbing take-up device 290 includes a restricting tab 292 serving as a restricting member. As illustrated in the perspective view in FIG. 14, the restricting tab 292 is formed in a narrow width plate shape with its length direction running along a tangential line in the rotation direction of the lock ring 214. As illustrated in FIG. 15, the restricting tab 292 is disposed between the leading end of the stopper pawl 218 and the outer peripheral portion of the lock ring 214. One end of the restricting tab 292 enters a housing hole 294 formed at a body 3206. The housing hole 294 is open at an inner peripheral portion of the lock ring housing portion 207, and is able to house a large portion of the restricting tab 292. However, a shear wall 296 is formed at an entry side of the housing hole 294, and the one end of the restricting tab 292 abuts the shear wall 296. The restricting tab 292 is thereby unable to enter further inside the housing hole 294 unless the shear wall 296 is broken.

Figure 14:
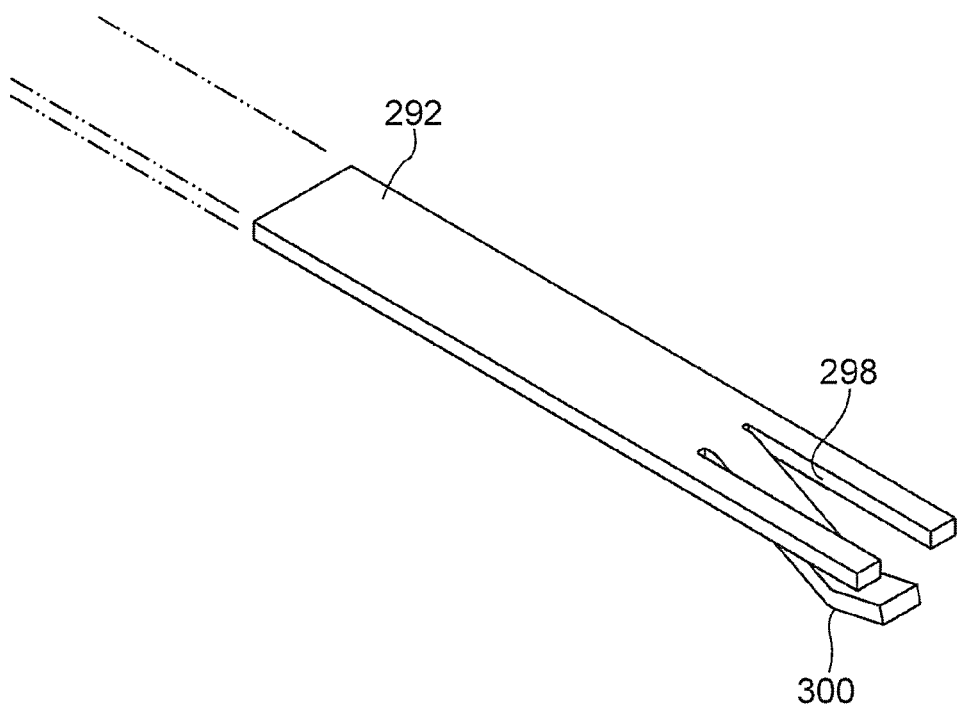
FIG. 14 is a perspective view illustrating a configuration of a restricting member of a webbing take-up device according to a third exemplary embodiment.

As illustrated in FIG. 14, a cutout portion 298 is formed at the other end side of the restricting tab 292. The cutout portion 298 opens at the other length direction end portion of the restricting tab 292, and pierces through the thickness direction of restricting tab 292. An elastic abutting portion 300 is also formed at the restricting tab 292. The elastic abutting portion 300 extends out from a bottom portion of the cutout portion 298 in a direction sloping toward the radial direction inside of the lock ring 214 with respect to a direction toward the other length direction end side of the restricting tab 292. The elastic abutting portion 300 is bent at a length direction intermediate portion thereof, and a leading end side beyond the bent portion extends toward the main body portion side of the restricting tab 292 with respect to the direction toward the other length direction end side of the restricting tab 292.

Operation and Advantageous Effects of Third Exemplary Embodiment

Figure 16:
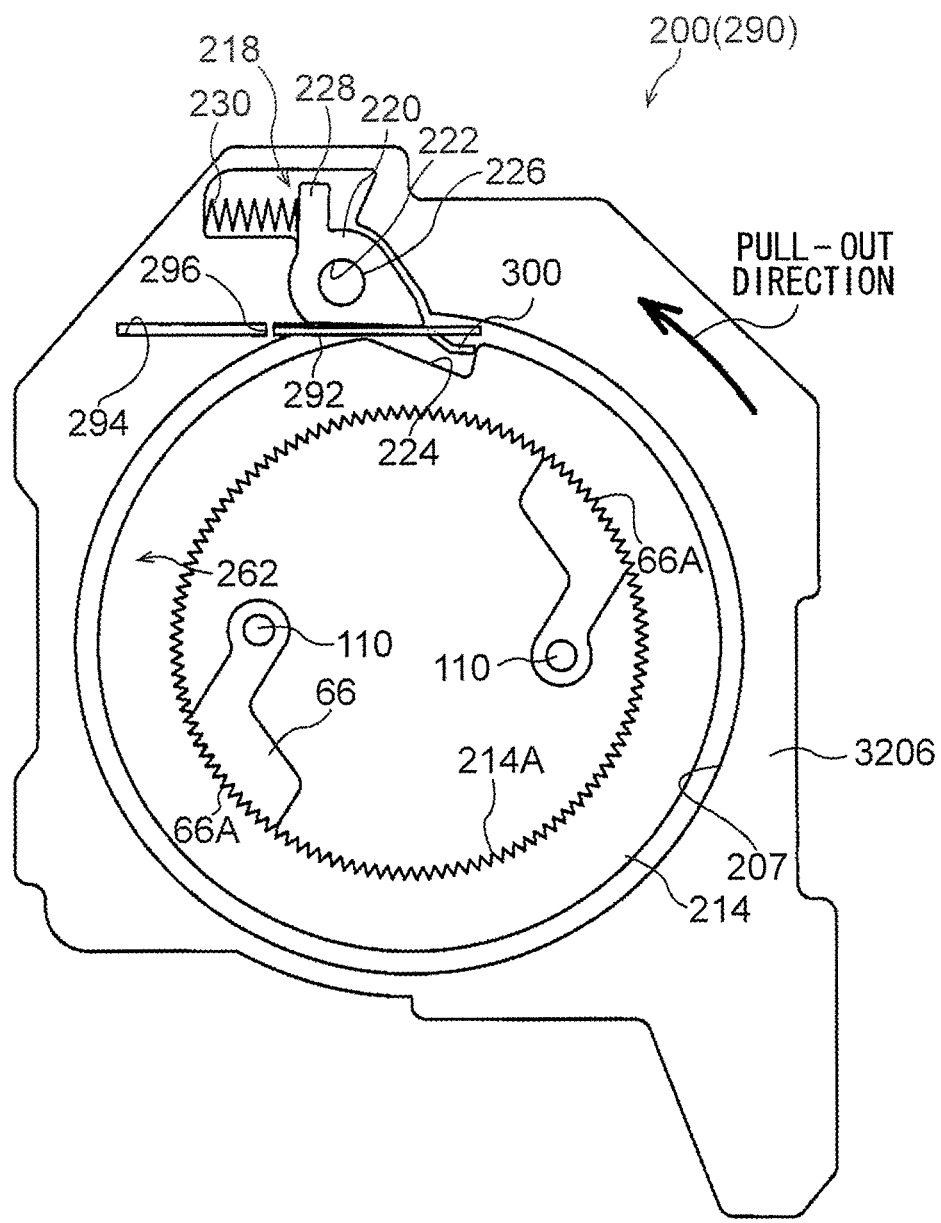
FIG. 16 is a side view corresponding to FIG. 15, illustrating a state in which the rotating body has rotated until an engagement recess portion is positioned beside the lock member in a first rotation of the rotating body.

In the initial state illustrated in FIG. 15, the other end side of the restricting tab 292 is positioned in a gap between the inner peripheral portion of the lock ring housing portion 207 and the outer peripheral portion of the lock ring 214, together with the elastic abutting portion 300. In this state, the knurled portions 66A of the clutch plates 66 enmesh with the knurled portion 214A of the lock ring 214, and the lock ring 214 rotates in the pull-out direction together with the spool 14. When the engagement recess portion 224 faces the elastic abutting portion 300, as illustrated in FIG. 16, the elastic abutting portion 300 thereby enters inside the engagement recess portion 224 due to elastic recovery force.

In this state, the restricting tab 292 is interposed between the leading end of the stopper pawl 218 and the outer peripheral portion of the lock ring 214. Although the leading end of the stopper pawl 218 faces the engagement recess portion 224, the leading end of the stopper pawl 218 is accordingly unable to enter the engagement recess portion 224.

Figure 17:
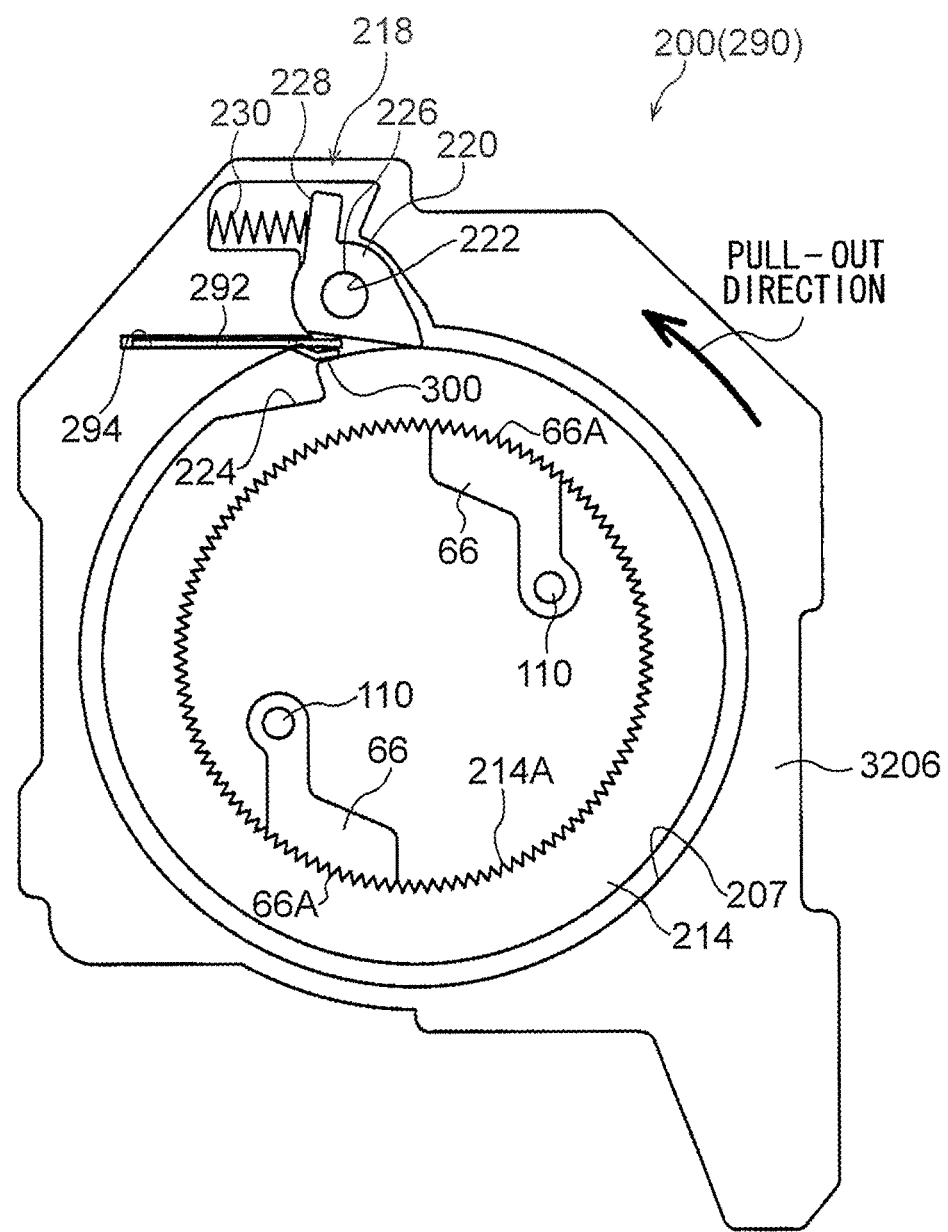
FIG. 17 is a side view corresponding to FIG. 15, illustrating a state in which the restricting member has moved.

When the lock ring 214 rotates further in the pull-out direction from this state, an inner wall of the engagement recess portion 224 presses the leading end of the elastic abutting portion 300. The one end of the restricting tab 292 accordingly presses the shear wall 296 formed at the housing hole 294, and the shear wall 296 breaks. When the leading end of the elastic abutting portion 300 is further pressed by the inner wall of the engagement recess portion 224 in this state, as illustrated in FIG. 17, a large portion of the restricting tab 292 is then pressed further into the housing hole 294.

Figure 18:
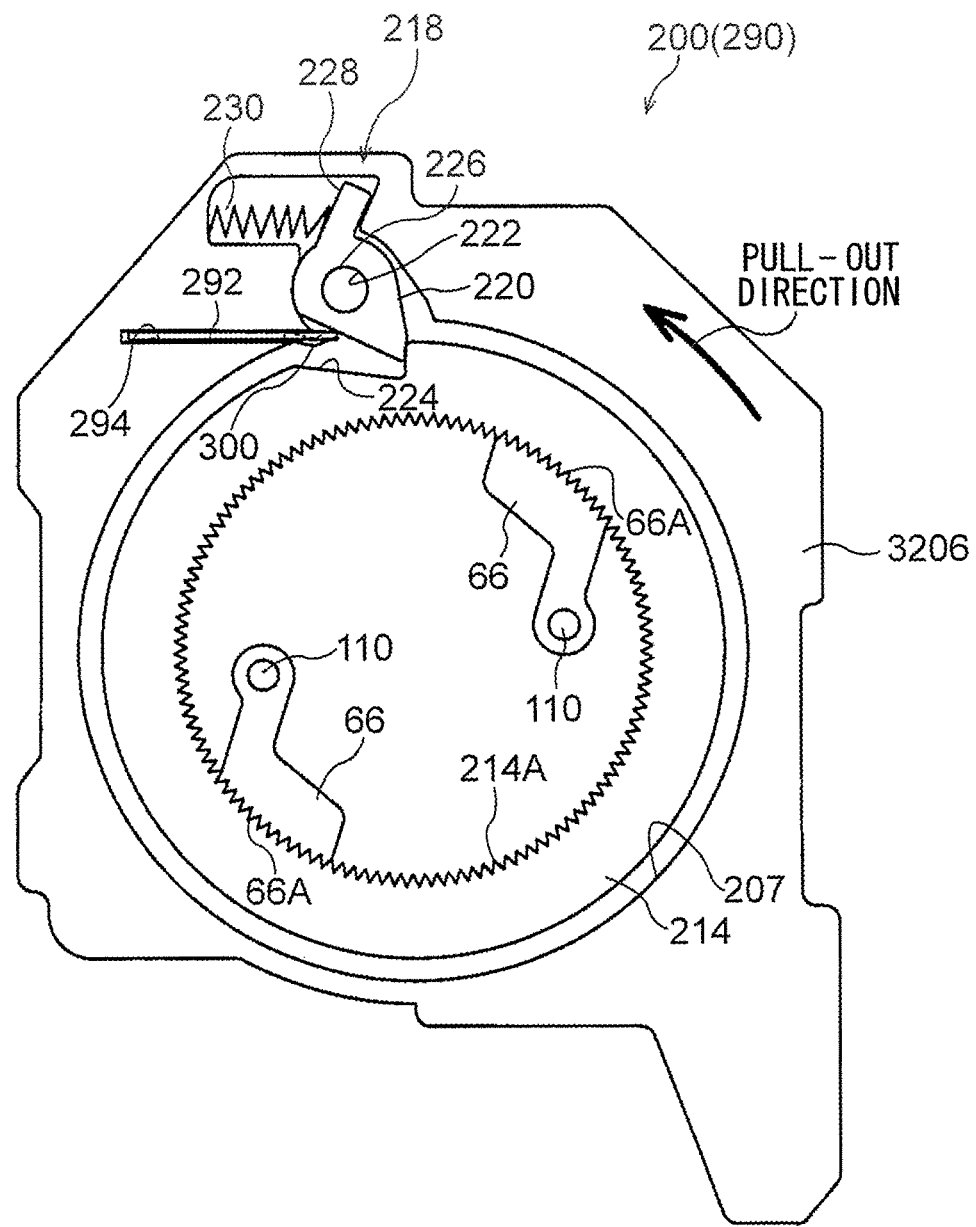
FIG. 18 is a side view corresponding to FIG. 15, illustrating a state in which the lock member has entered the engagement recess portion.

In a state in which the lock ring 214 further rotates approximately one rotation in the pull-out direction from this state, and the engagement recess portion 224 faces the leading end of the stopper pawl 218, the restricting tab 292 is not interposed between the leading end of the stopper pawl 218 and the engagement recess portion 224. Thus, as illustrated in FIG. 18, the leading end of the stopper pawl 218 enters the engagement recess portion 224. The lock ring 214 is thereby restricted from rotating in the pull-out direction. The sleeve-side engaging portion 52 of the sub torsion shaft 24 is restricted from rotating in the pull-out direction due to the lock ring 214 being restricted from rotating in the pull-out direction in this manner, and the sub energy absorption portion 54 of the sub torsion shaft 24 starts to undergo twisting deformation due to the spool 14 rotating in the pull-out direction.

Thus in the webbing take-up device 290 according to the present exemplary embodiment, the engagement recess portion 224 passes beside the leading end of the stopper pawl 218 once after the lock ring 214 has started rotating in the pull-out direction, after which the lock ring 214 is not restricted from rotating in the pull-out direction until the engagement recess portion 224 arrives beside the leading end of the stopper pawl 218 again. The number of rotations of the spool 14 occurred from the start of twisting deformation of the main torsion shaft 20 until the start of twisting deformation of the sub torsion shaft 24 therefore exceeds one rotation.

Configuration of Fourth Exemplary Embodiment

Explanation follows regarding a fourth exemplary embodiment.

Figure 20:
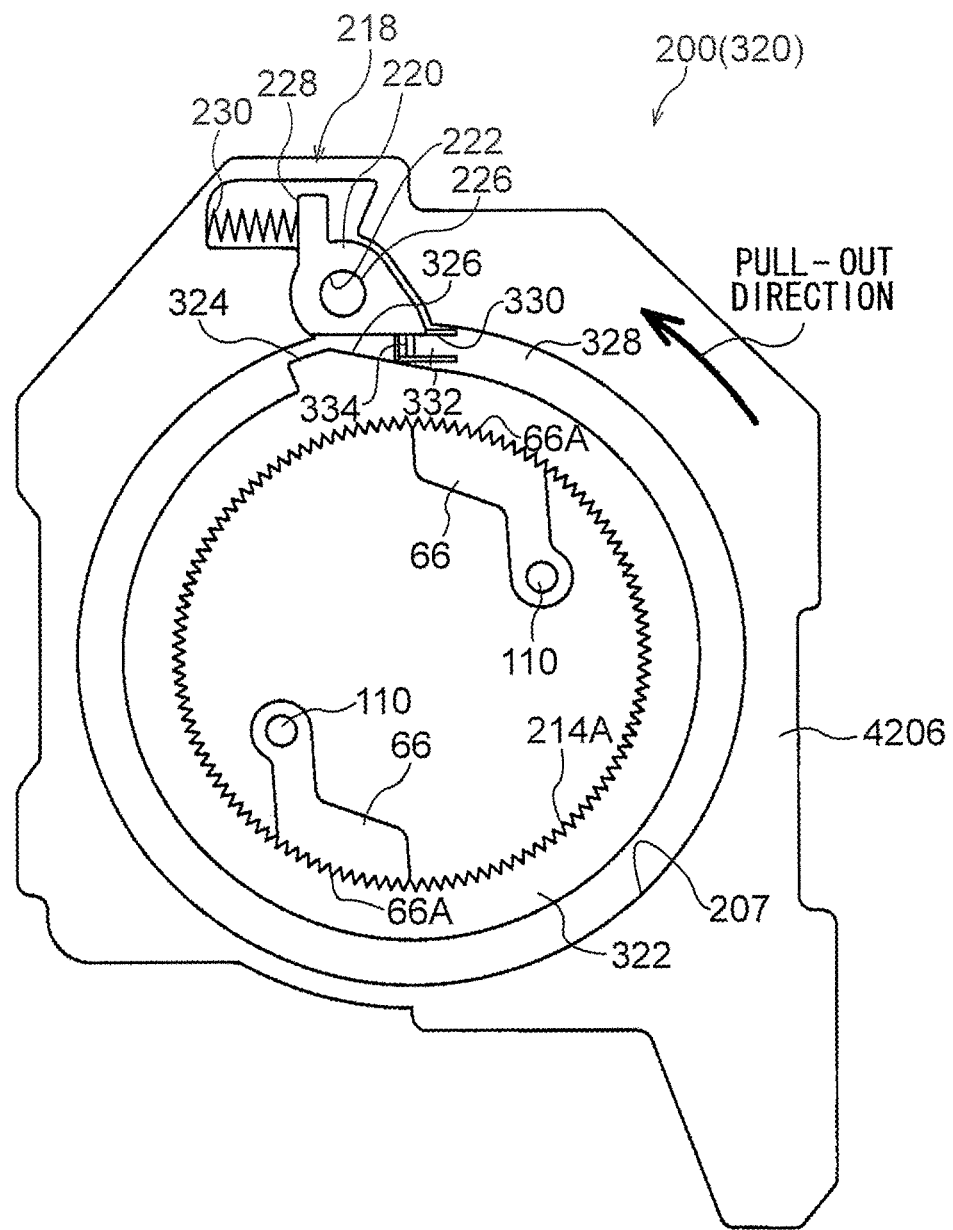
FIG. 20 is a side view illustrating an initial state of a rotating body, a lock member, and a restricting member of a webbing take-up device according to the fourth exemplary embodiment.
Figure 21:
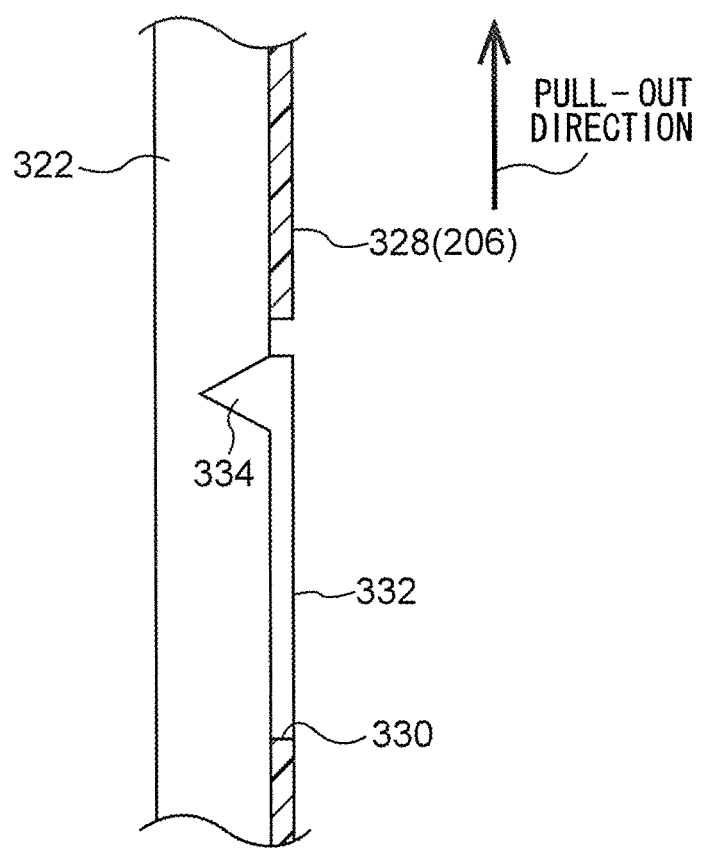
FIG. 21 is a lateral cross-section illustrating a state in which a restricting member is in an initial state.

FIG. 20 is a side view corresponding to FIG. 4, used to explain the first exemplary embodiment, illustrating a configuration of relevant portions of a webbing take-up device 320 according to the present exemplary embodiment.

As illustrated in FIG. 20, the webbing take-up device 320 includes a lock ring 322 serving as a rotating body instead of the lock ring 214. The engagement recess portion 224 is not formed at the lock ring 322, and an engagement protrusion portion 324, serving as an engagement portion, is formed instead. The engagement protrusion portion 324 extends out from an outer peripheral portion of the lock ring 322 toward the radial direction outside. A take-up direction side of the engagement protrusion portion 324 configures a sloped face 326, and a radial dimension at the sloped face 326 from the center of the lock ring 322 to the sloped face 326 gradually shortens on progression toward the take-up direction side. The lock ring 322 is restricted from rotating in the pull-out direction due to the leading end of the stopper pawl 218 abutting the engagement protrusion portion 324 from the pull-out direction side.

Figure 19:
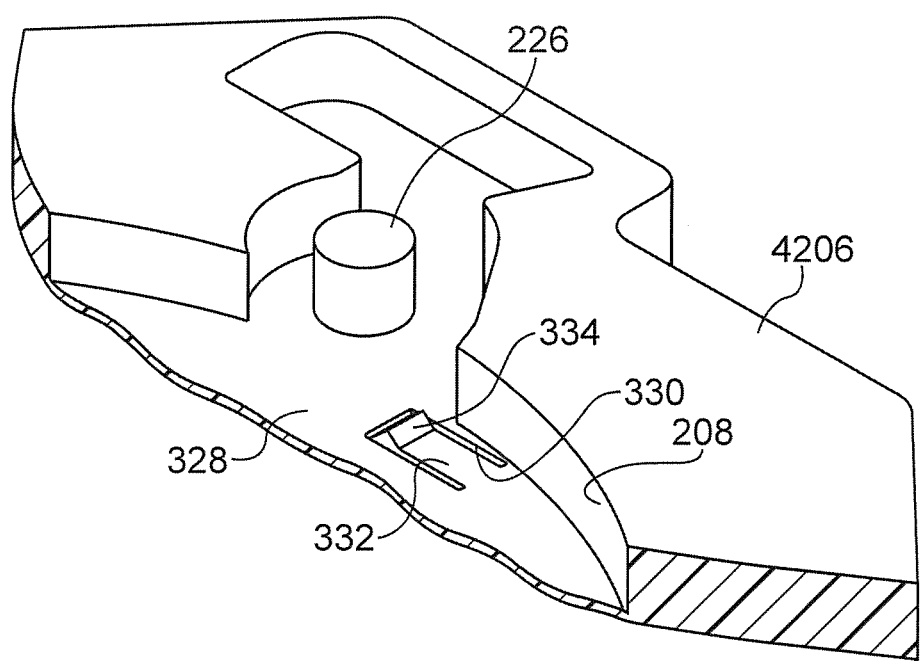
FIG. 19 is a perspective view illustrating a configuration of a restricting member of a webbing take-up device according to a fourth exemplary embodiment.
Figure 24:
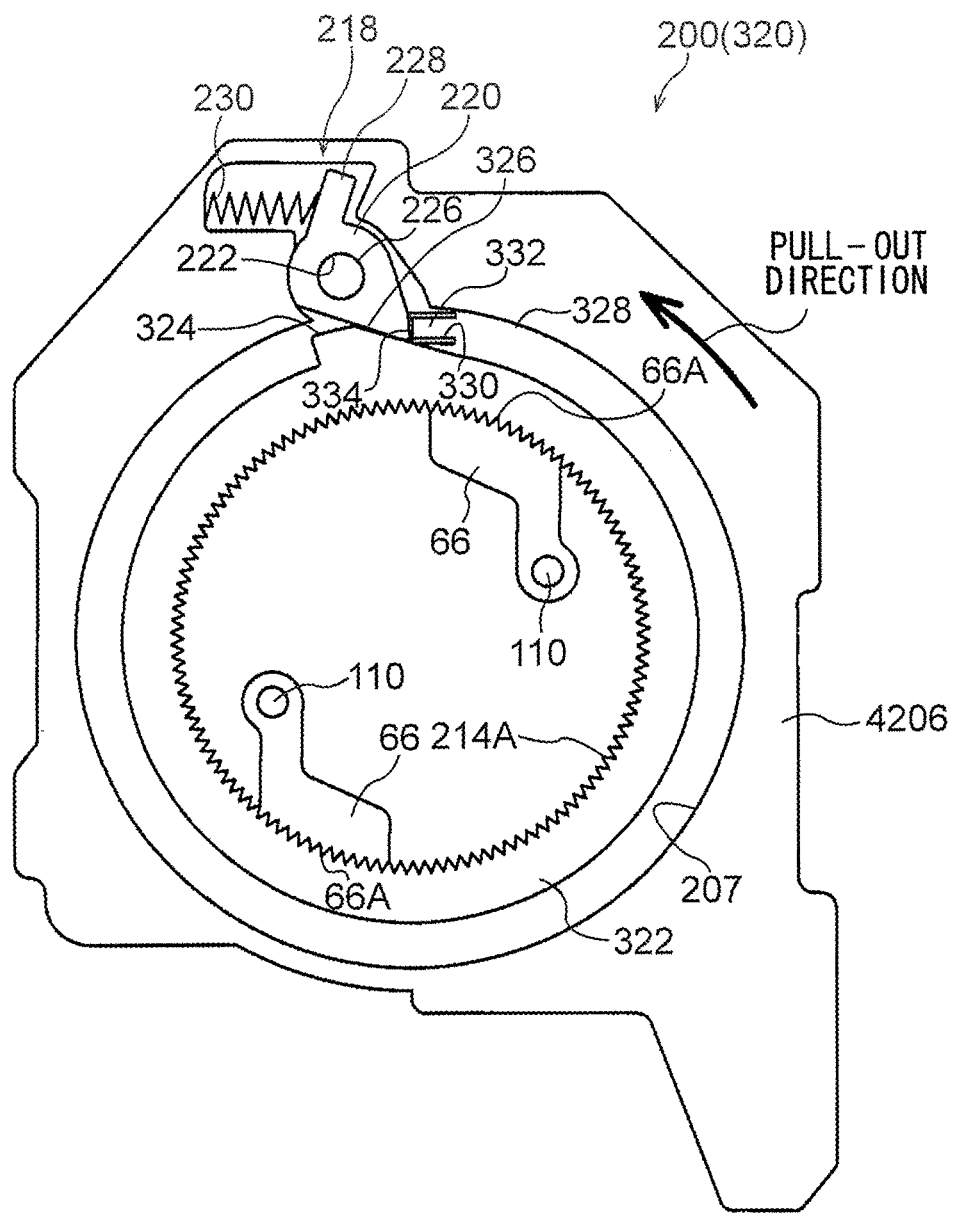
FIG. 24 is a side view corresponding to FIG. 20, illustrating a state in which the rotating body has rotated in the pull-out direction from the state illustrated in FIG. 23.

As illustrated in FIG. 19, a rectangular shaped through-hole 330 is formed in a bottom wall 328 of the lock ring housing portion 207 of a body 4206. An elastic tab 332, serving as a restricting member, extends out from a take-up direction side end portion of an inner peripheral portion of the through-hole 330. The elastic tab 332 is configured in a narrow width plate shape with its length direction along the extension direction from the inner peripheral portion of the through-hole 330, and its thickness direction along the thickness direction of the bottom wall 328. As illustrated in FIG. 24, a leading end of the elastic tab 332 configures a free end, and the elastic tab 332 is capable of elastic deformation about its axial direction, its axial direction being the width direction.

As illustrated in FIG. 19, a supporting projection 334 is formed at the leading end of the elastic tab 332. The supporting projection 334 is formed so as to project out from the leading end of the elastic tab 332 toward the inside of the lock ring housing portion 207. As illustrated in FIG. 20, the leading end of the stopper pawl 218 press-contacts an upper face of the supporting projection 334 at a portion thereof located further toward the radial direction outside of the lock ring 322 than the outer face of the engagement protrusion portion 324 of the lock ring 322. The supporting projection 334 enters inside the lock ring housing portion 207, and is positioned on the rotation trajectory of the engagement protrusion portion 324 due to rotation of the lock ring 322.

Operation and Advantageous Effects of Fourth Exemplary Embodiment

Figure 22:
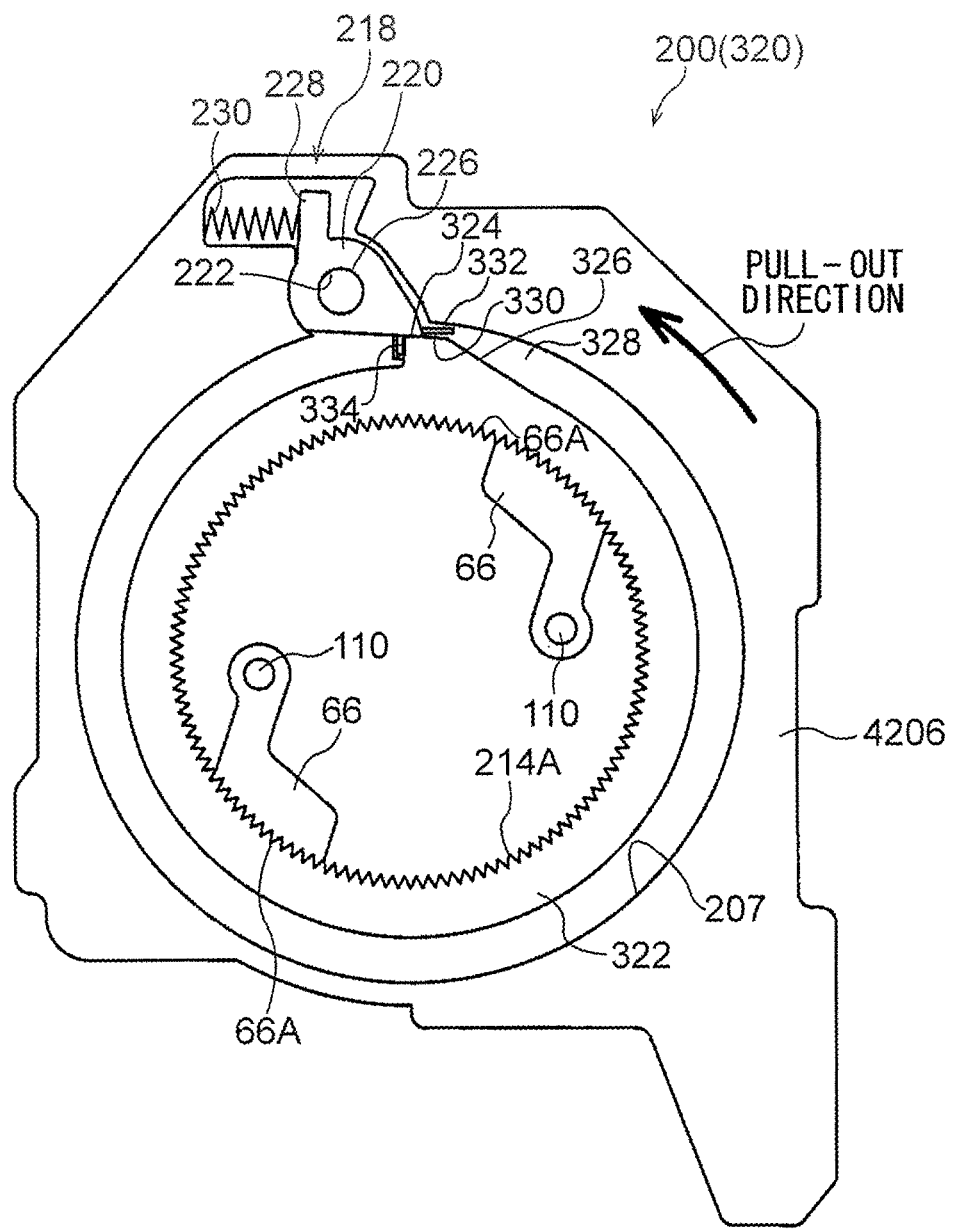
FIG. 22 is a side view corresponding to FIG. 20, illustrating a state in which the restricting member has undergone elastic deformation and support of the lock member is released.
Figure 23:
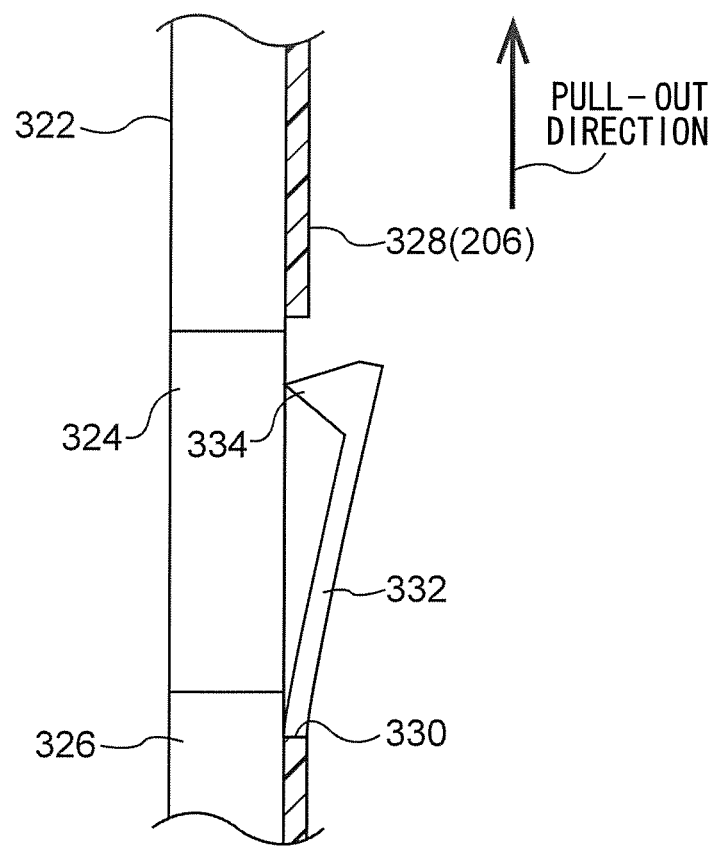
FIG. 23 is a lateral cross-section of the state in FIG. 22, corresponding FIG. 21.

In the initial state illustrated in FIG. 20, when the knurled portions 66A of the clutch plates 66 enmesh with the knurled portion 214A of the lock ring 322, the lock ring 322 rotates in the pull-out direction together with the spool 14. As illustrated in FIG. 22, due to the lock ring 322 rotating approximately once in the pull-out direction, the engagement protrusion portion 324 of the lock ring 322 and the supporting projection 334 of the elastic tab 332 face each other in the axial direction of the lock ring 322, and as illustrated in FIG. 22 and FIG. 23, the supporting projection 334 is pressed by the engagement protrusion portion 324, and the elastic tab 332 undergoes elastic deformation toward the opposite side to the open side of the lock ring housing portion 207. When the elastic tab 332 undergoes elastic deformation in this manner, the state in which an upper face of the supporting projection 334 faces the leading end of the stopper pawl 218 is released. The leading end of the stopper pawl 218 thereby loses the support caused by the press contact with by the supporting projection 334, and press-contacts the outer face of the engagement protrusion portion 324.

When the lock ring 322 rotates further in the pull-out direction in this state, and the sloped face 326 of the engagement protrusion portion 324 faces the leading end of the stopper pawl 218, the leading end of the stopper pawl 218 press-contacts the sloped face 326. When the lock ring 322 rotates further in the pull-out direction in this state, as illustrated in FIG. 24, the leading end of the stopper pawl 218 then gradually turns toward the rotation radial direction inside of the lock ring 322 so as to follow the sloped face 326. The stopper pawl 218 faces the supporting projection 334 along the axial direction of the lock ring 322 in this state. The supporting projection 334 accordingly press-contacts the stopper pawl 218, and the elastic tab 332 is unable to return to the original state due to its elastic recovery force.

Figure 25:
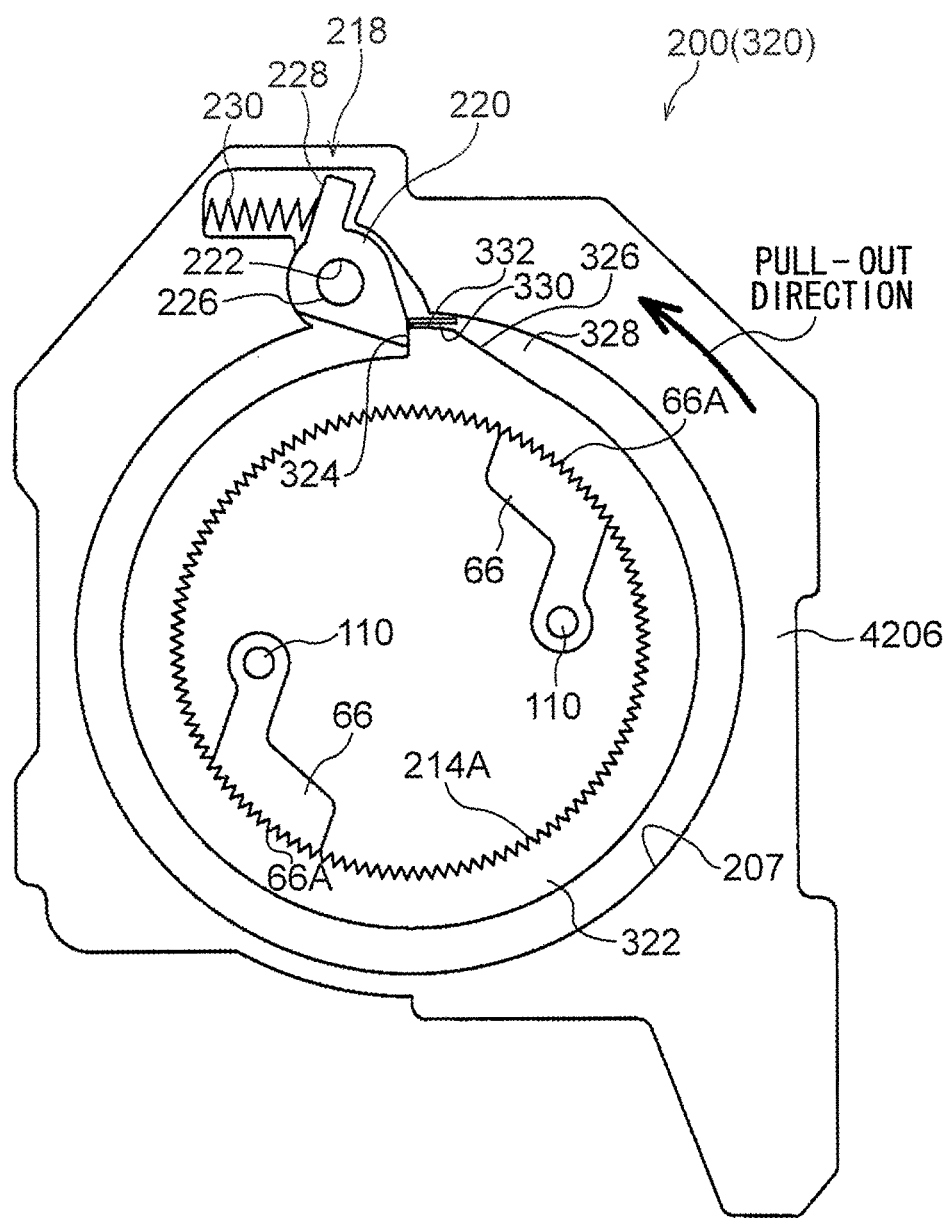
FIG. 25 is a side view corresponding to FIG. 20, illustrating a state in which the lock member abuts the engagement protrusion portion from the pull-out direction side.

When the lock ring 322 further rotates approximately once in the pull-out direction from this state, the leading end of the stopper pawl 218 faces the engagement protrusion portion 324 at the pull-out direction side of the engagement protrusion portion 324, and, as illustrated in FIG. 25, the leading end of the stopper pawl 218 abuts the engagement protrusion portion 324. The lock ring 322 is thereby restricted from rotating in the pull-out direction. The sleeve-side engaging portion 52 of the sub torsion shaft 24 is restricted from rotating in the pull-out direction due to the lock ring 322 being restricted from rotating in the pull-out direction in this manner, and the sub energy absorption portion 54 of the sub torsion shaft 24 starts to undergo twisting deformation due to the spool 14 rotating in the pull-out direction.

Thus in the webbing take-up device 320 according to the present exemplary embodiment, the engagement protrusion portion 324 passes beside the leading end of the stopper pawl 218 once after the lock ring 322 has started rotating in the pull-out direction, after which the lock ring 322 is not restricted from rotating in the pull-out direction until the leading end of the stopper pawl 218 abuts the engagement protrusion portion 324 from the pull-out direction side. The number of rotations of the spool 14 occurred from the start of twisting deformation of the main torsion shaft 20 until the start of twisting deformation of the sub torsion shaft 24 therefore exceeds one rotation.

The entire content of the disclosure of Japanese Patent Application No. 2013-084172 are incorporated by reference in the present specification.

All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A webbing take-up device comprising:
   a spool that takes up webbing;
   a lock base that is provided at one axial direction end side of the spool so as to be rotatable relative to the spool;
   a first energy absorption member that deforms due to the spool rotating in a pull-out direction relative to the lock base;
   a second energy absorption member that has one end linked to the spool in a state in which rotation relative to the spool is restricted and that deforms due to the one end rotating in the pull-out direction relative to another end;
   a rotating body that is provided at another axial direction end side of the spool and that is rotatable coaxially with the spool;
   a coupling member that operates by the spool rotating in the pull-out direction relative to the lock base, that couples the rotating body to the other end of the second energy absorption member, thereby enabling the other end of the second energy absorption member and the rotating body to rotate as a single unit in the pull-out direction;
   a lock member that is provided beside the rotating body, that is capable of moving in a direction approaching the rotating body, and that restricts the rotating body from rotating in the pull-out direction by approaching the rotating body and engaging with an engagement portion formed at the rotating body; and
   a restricting member that restricts the lock member from moving to an engaged position with the engagement portion, and that releases the movement restriction on the lock member after the rotating body has rotated once in the pull-out direction,
   wherein:
   the engagement portion is configured by an engagement protrusion portion projecting toward the outside of the rotating body from an outer peripheral portion of the rotating body, and the rotating body is restricted from rotating in the pull-out direction by the lock member abutting the engagement protrusion portion from the pull-out direction side;
   the restricting member is provided on a rotation trajectory of the engagement protrusion portion due to rotation of the rotating body, the restricting member is configured to support the lock member and to restrict movement of the lock member, the restricting member faces the engagement protrusion portion of the rotating body that is rotated in the pull-out direction in the first rotation of the rotating body, the restricting member is thereby pressed and displaced by the engagement protrusion portion, and the restricting member releases the support of the lock member; and the lock member is configured to be biased in a direction approaching the outer peripheral portion of the rotating body, to press-contact a radial direction outside face of the engagement protrusion portion due to the support of the lock member by the restricting member being released, to approach the outer peripheral portion of the rotating body due to the rotating body rotating further in the pull-out direction, and to be able to abut the engagement protrusion portion of the rotating body.

2. The webbing take-up device of claim 1, wherein: the webbing take-up device further includes a support member; and the restricting member is an elastic tab provided at the support member, and the restricting member is biased toward the lock member and supports and restricts movement of the lock member.

* * * * *